US012431064B2

(12) United States Patent
Ge et al.

(10) Patent No.: US 12,431,064 B2
(45) Date of Patent: Sep. 30, 2025

(54) LUMINANCE COMPENSATION METHOD OF DISPLAY PANEL, LUMINANCE COMPENSATION APPARATUS, LUMINANCE COMPENSATION DEVICE, AND STORAGE MEDIUM

(71) Applicant: Xiamen Tianma Display Technology Co., Ltd., Xiamen (CN)

(72) Inventors: Zhiqiang Ge, Xiamen (CN); Yinzeng Li, Xiamen (CN); Yang Liu, Xiamen (CN); Jingxiong Zhou, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 168 days.

(21) Appl. No.: 18/204,967

(22) Filed: Jun. 2, 2023

(65) Prior Publication Data

US 2024/0274061 A1 Aug. 15, 2024

(30) Foreign Application Priority Data

Feb. 16, 2023 (CN) ......................... 202310122927.1

(51) Int. Cl.
*G09G 3/30* (2006.01)

(52) U.S. Cl.
CPC ....... *G09G 3/30* (2013.01); *G09G 2320/0233* (2013.01); *G09G 2354/00* (2013.01); *G09G 2360/16* (2013.01)

(58) Field of Classification Search
CPC ............. G09G 3/30; G09G 2320/0233; G09G 2354/00; G09G 2360/16; G09G 3/3225; G09G 2320/0693
See application file for complete search history.

(56) References Cited

U.S. PATENT DOCUMENTS

2012/0182251 A1* 7/2012 Krah .................. G06F 3/04182 345/174
2021/0118349 A1* 4/2021 Choi ..................... G06F 3/0446
(Continued)

FOREIGN PATENT DOCUMENTS

CN 116072037 A * 5/2023
KR 20220093693 A * 7/2022
(Continued)

*Primary Examiner* — Temesghen Ghebretinsae
*Assistant Examiner* — Karin Kiyabu
(74) *Attorney, Agent, or Firm* — East IP P.C.

(57) ABSTRACT

The present application discloses a luminance compensation method of a display panel, a luminance compensation apparatus, a luminance compensation device and a storage medium. The method includes: acquiring first correspondence relationships respectively corresponding to touch sensing regions, wherein the first correspondence relationship is a correspondence relationship of light-emitting luminance and mutual capacitances; acquiring first mutual capacitances of the touch sensing regions transmitted by a touch chip; determining actual luminance values of light-emitting pixel regions respectively corresponding to the touch sensing regions according to the first mutual capacitances and the first correspondence relationships of the touch sensing regions, wherein the light-emitting pixel region comprises at least one light-emitting pixel; generating a compensation instruction according to the actual luminance values of the light-emitting pixel regions and target luminance values, thereby causing a driving chip to make luminance compensation for the light-emitting pixel regions according to the compensation instruction.

15 Claims, 13 Drawing Sheets

(56) References Cited

U.S. PATENT DOCUMENTS

| | | | | |
|---|---|---|---|---|
| 2022/0208090 | A1* | 6/2022 | Lee | G09G 3/3208 |
| 2025/0085811 | A1* | 3/2025 | Zhou | G06F 3/0412 |
| 2025/0103160 | A1* | 3/2025 | Wei | G06F 3/0445 |

FOREIGN PATENT DOCUMENTS

| | | | | |
|---|---|---|---|---|
| WO | WO-2022001321 | A1 * | 1/2022 | G09G 3/006 |
| WO | WO-2024221677 | A1 * | 10/2024 | G09G 3/20 |

* cited by examiner

LUMINANCE COMPENSATION METHOD OF DISPLAY PANEL, LUMINANCE COMPENSATION APPARATUS, LUMINANCE COMPENSATION DEVICE, AND STORAGE MEDIUM

CROSS-REFERENCE TO RELATED APPLICATION

This application claims priority to Chinese Patent Application No. 202310122927.1, filed on Feb. 16, 2023, which is incorporated herein by reference in its entirety.

TECHNICAL FIELD

The present application relates to a technical field of display, and particularly relates to a luminance compensation method of a display panel, a luminance compensation apparatus, a luminance compensation device and a storage medium.

BACKGROUND

Currently, the display panel is usually composed of a plurality of light-emitting pixels arranged in an array, and the light-emitting pixel includes a pixel circuit and a light-emitting element. The pixel circuit is usually composed of a thin film transistor (TFT) and a capacitor. The light-emitting element can usually include an organic light-emitting diode (OLED) or other light-emitting devices.

Driven by the scanning signal line and the data signal line, the pixel circuit may electrically connect the light-emitting element to the power supply signal line, so as to emit light from the light-emitting element. However, when various signal lines transmit the corresponding signal voltages, due to a certain impedance on the signal line, the pixel circuit will be affected by the voltage drop of the line impedance, and the actual signal voltage received deviates from the original signal voltage.

In order to avoid the phenomenon of uneven luminance caused by the signal voltage deviation, luminance compensation for the display panel will be performed in the relevant technology. For example, sampling compensation is performed in the same batch of products. However, there will also be some differences between different products in the same batch, and the method of sampling compensation will lead to the poor compensation effect of some products.

SUMMARY

Embodiments of the present application provide a luminance compensation method of a display panel, a luminance compensation apparatus, a luminance compensation device and a storage medium.

In a first aspect, an embodiment of the present application provides a luminance compensation method of a display panel, wherein the display panel comprises at least one first touch electrode and at least one second touch electrode staggered with each other, the method including: acquiring first correspondence relationships respectively corresponding to touch sensing regions, the first correspondence relationship being a correspondence relationship of light-emitting luminance and mutual capacitance, the touch sensing region being a capacitance variable region formed by a single first touch electrode and a single second touch electrode; acquiring first mutual capacitances of the touch sensing regions transmitted by a touch chip, the first mutual capacitance being a coupling capacitance of a single first touch electrode and a single second touch electrode; determining actual luminance values of light-emitting pixel regions respectively corresponding to the touch sensing regions according to the first mutual capacitances and the first correspondence relationships of the touch sensing regions, the light-emitting pixel region comprising at least one light-emitting pixel; generating a compensation instruction according to the actual luminance values and target luminance values of the light-emitting pixel regions to cause a driving chip to make luminance compensation for the light-emitting pixel regions according to the compensation instruction.

In a second aspect, an embodiment of the present application provides a luminance compensation apparatus of a display panel, wherein the apparatus comprises: a first acquisition module configured to acquire first correspondence relationships respectively corresponding to touch sensing regions, the first correspondence relationship being a correspondence relationship of light-emitting luminance and mutual capacitances; a second acquisition module configured to acquire first mutual capacitances of the touch sensing regions transmitted by a touch chip, the touch sensing region being a capacitance variable region formed by a single first touch electrode and a single second touch electrode, the first mutual capacitance being a coupling capacitance of a single first touch electrode and a single second touch electrode; a luminance determination module configured to determine actual luminance values of light-emitting pixel regions respectively corresponding to the touch sensing regions according to the first mutual capacitances and the first correspondence relationships of the touch sensing regions, the light-emitting pixel region comprising at least one light-emitting pixel; a first compensation module configured to generate a compensation instruction according to the actual luminance values and target luminance values of the light-emitting pixel regions to cause a driving chip to make luminance compensation for the light-emitting pixel regions according to the compensation instruction.

In a third aspect, an embodiment of the present application provides a luminance compensation device of a display panel, wherein the luminance compensation device of the display panel comprises: a processor and a memory storing computer program instructions; wherein the processor, when executing the computer program instructions, implements the luminance compensation method of the display panel as described in the first aspect.

In a fourth aspect, an embodiment of the present application provides a computer storage medium having computer program instructions stored thereon, wherein the computer program instructions, when executed by the processor, implement the luminance compensation method of the display panel as described in the first aspect.

BRIEF DESCRIPTION OF THE DRAWINGS

In order to illustrate technical solutions of embodiments of the present application more clearly, the drawings required for the embodiments of the present application will be briefly described. Obviously, the drawings described below are only some embodiments of the present application. For a person skilled in the art, other drawings can also be obtained from these drawings without any inventive effort.

DETAILED DESCRIPTION

Figure 1:
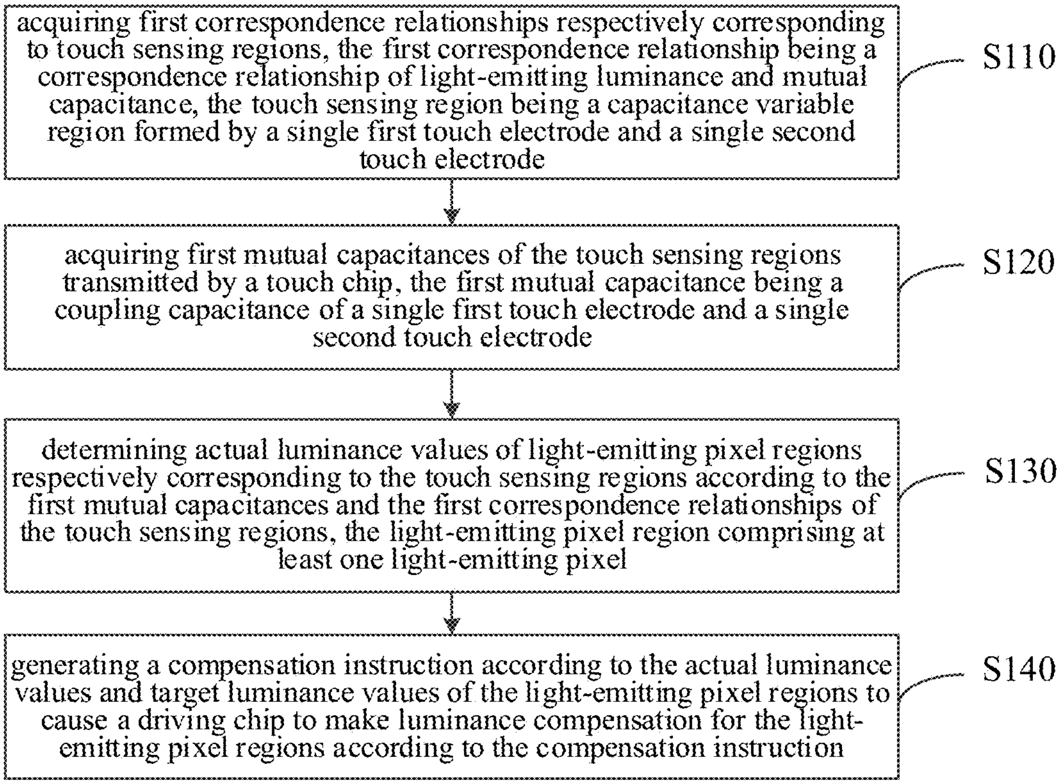
FIG. 1 is a schematic flowchart of a luminance compensation method of a display panel provided by an embodiment of the present application.

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only intended to explain the present application, but not to limit the present application. It will be apparent to a person skilled in the art that the present application may be practiced without some of these specific details. The following description of the embodiments is merely to provide a better understanding of the present application by illustrating examples of the present application.

It should be noted that, in this document, relational terms such as first and second are used only to distinguish one entity or operation from another entity or operation, and do not necessarily require or imply such an actual relationship or sequence between these entities or operations. Moreover, the terms "including", "including" or any other variation thereof are intended to encompass a non-exclusive inclusion such that a process, method, article or device that includes a list of elements includes not only those elements, but also includes other elements that are not explicitly listed but inherent to such a process, method, article or device. Without further limitation, an element defined by the term "including . . . " does not preclude presence of additional elements in a process, method, article or device that includes the element.

It should be noted that the embodiments in the present application as well as the features in the embodiments may be combined with each other without conflict. The embodiments will be described in detail below in combination with the accompanying drawings.

Currently, the display panel is usually composed of a plurality of light-emitting pixels arranged in an array, and the light-emitting pixel includes a pixel circuit and a light-emitting element. The pixel circuit is usually composed of a thin film transistor (TFT) and a capacitor. The light-emitting element can usually include an organic light-emitting diode (OLED) or other light-emitting devices.

Driven by the scanning signal line and the data signal line, the pixel circuit may electrically connect the light-emitting element to the power supply signal line, so as to emit light from the light-emitting element. However, when various signal lines transmit the corresponding signal voltages, due to a certain impedance on the signal line, the pixel circuit will be affected by the voltage drop of the line impedance, and the actual signal voltage received deviates from the original signal voltage.

In order to avoid the phenomenon of uneven luminance caused by the signal voltage deviation, luminance compensation for the display panel will be performed in the relevant technology. For example, sampling compensation is performed in the same batch of products. However, there will also be some differences between different products in the same batch, and the method of sampling compensation will lead to the poor compensation effect of some products.

In order to solve the above technical problems, the embodiments of the present application provide a luminance compensation method of a display panel, a luminance compensation apparatus, a luminance compensation device and a storage medium. Firstly, the display panel provided by the embodiments of the present application is described below.

FIG. 1 illustrates a schematic flowchart of a luminance compensation method of a display panel provided by an embodiment of the present application. The display panel includes at least one first touch electrode and at least one second touch electrode staggered with each other, and the luminance compensation method of the display panel includes S110 to S140.

S110: acquiring first correspondence relationships respectively corresponding to touch sensing regions, the first correspondence relationship being a correspondence relationship of light-emitting luminance and mutual capacitance, the touch sensing region being a capacitance variable region formed by a single first touch electrode and a single second touch electrode;

S120: acquiring first mutual capacitances of the touch sensing regions transmitted by a touch chip, the first mutual capacitance being a coupling capacitance of a single first touch electrode and a single second touch electrode;

S130: determining actual luminance values of light-emitting pixel regions respectively corresponding to the touch sensing regions according to the first mutual capacitances and the first correspondence relationships of the touch sensing regions, the light-emitting pixel region comprising at least one light-emitting pixel;

S140: generating a compensation instruction according to the actual luminance values and target luminance values of the light-emitting pixel regions to cause a driving chip to make luminance compensation for the light-emitting pixel regions according to the compensation instruction.

The luminance compensation method of the display panel provided in the embodiment of the present application may be applied to the luminance compensation apparatus of the display panel, which may make targeted luminance compensation for the light-emitting pixel regions in the display panel respectively. The display panel can be a PC, a TV, a smart terminal, a tablet, and the like. The specific form of the display panel is not limited in this embodiment.

In this embodiment, the first mutual capacitances of the touch sensing regions formed by the first touch electrodes and the second touch electrodes are acquired, and the actual luminance values of light-emitting pixel regions corresponding to the touch sensing regions may be determined according to the first mutual capacitances and the first correspondence relationships of the touch sensing regions. According to the actual luminance values and the target luminance values of the light-emitting pixel regions, the luminance difference of the light-emitting pixel regions when displaying can be determined, and the targeted luminance compensation can be performed for the light-emitting pixel regions. Since the first correspondence relationships of the touch sensing regions in the display panel are different, the targeted luminance compensation can be performed for the light-emitting pixel regions in the display panel, thereby improving the luminance compensation effect of the display panel.

In S110, currently, in order to realize the user's touch operations of the display panel product, a touch module may usually be disposed in the display panel. The touch module may include touch electrodes disposed in the display region of the display panel and a touch chip electrically connected to the touch electrodes. In the related art, self-capacitance touch sensing mode or mutual capacitance touch sensing mode is usually adopted. In the case of mutual capacitance touch sensing, the first touch electrodes and the second touch electrodes can be staggered with each other in the display panel, ones of which are the transmitting electrodes and the others are the receiving electrodes. The voltage signal may be output via the transmitting electrode, and the mutual capacitance between the two touch electrodes is determined by the amount of charge detected by the receiving electrode. When the user does not perform the touch operation, the amount of charge detected by the receiving electrode will have a positive correlation with the mutual capacitance between the two touch electrodes. When the user performs the touch operation, the mutual capacitance between the touch electrodes will decrease, thus reducing the amount of charge detected by the receiving electrode.

Figure 2:
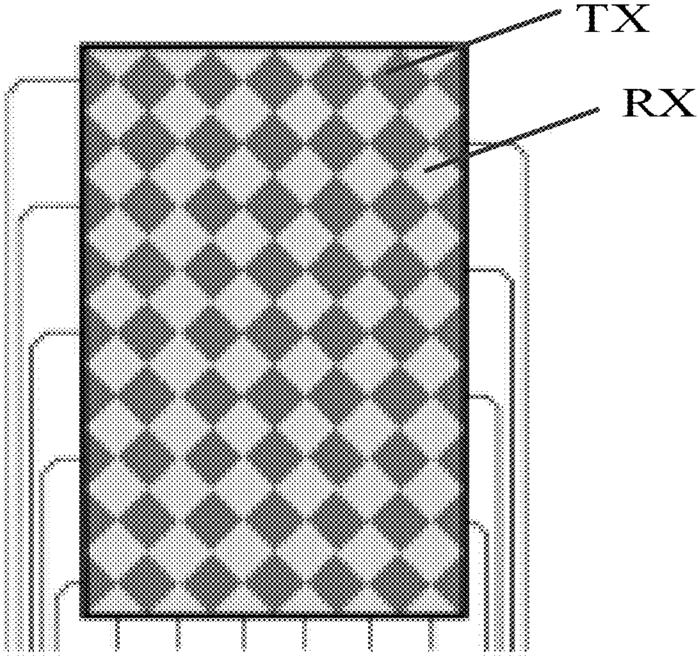
FIG. 2 is a schematic diagram of a touch electrode of a display panel provided by an embodiment of the present application.
Figure 3:
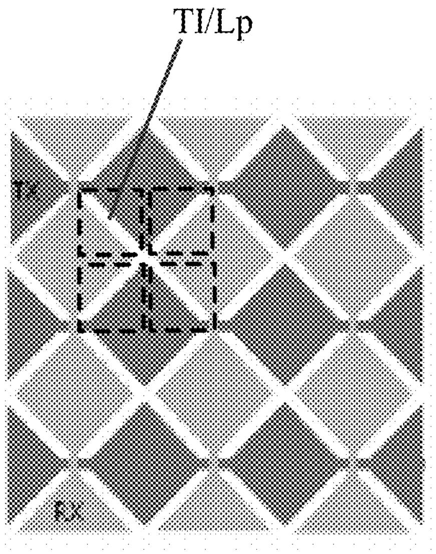
FIG. 3 is a schematic diagram of a touch sensing region of a display panel provided by an embodiment of the present application.

As shown in FIG. 2, the display panel may have a plurality of first touch electrodes TX and a plurality of second touch electrodes RX. A single first touch electrode TX and a single second touch electrode RX can form a capacitance variable region. The display region of the display panel can be divided into a plurality of capacitance variable regions. The touch sensing region is a capacitance variable region formed by a first touch electrode and a corresponding second touch electrode. As shown in FIG. 3, the region TI is a touch sensing region formed by a single first touch electrode TX and a single second touch electrode RX, and the plurality of first touch electrodes TX and the plurality of second touch electrodes RX in the display panel can form a plurality of touch sensing regions TI. Similarly, the region Lp shown in FIG. 3 is a light-emitting pixel region corresponding to the touch sensing region, and the plurality of touch sensing regions TI in the display panel respectively correspond to a plurality of light-emitting pixel regions Lp.

When the display panel is powered on to display, the first correspondence relationships respectively corresponding to the touch sensing regions may be acquired. The first correspondence relationship may be a correlation relationship between the light-emitting luminance of the partial display region corresponding to the touch sensing region and the mutual capacitance of the touch sensing region.

It is understood that the partial display region corresponding to the touch sensing region is the light-emitting pixel region corresponding to the touch sensing region, and the light-emitting luminance of the partial display region is the light-emitting luminance of the light-emitting pixel region. Since the light-emitting pixel region includes at least one light-emitting pixel, the light-emitting luminance of the light-emitting pixel region may be determined according to the luminance values of the plurality of light-emitting pixels contained in the light-emitting pixel region. For example, the light-emitting luminance of a single light-emitting pixel region may be an average of the luminance values of the light-emitting pixels contained in the light-emitting pixel region.

It should be noted that when the luminance of the image picture in the display panel is adjusted by the inventor, the mutual capacitances of the touch sensing region respectively corresponding to different luminance are measured. As shown in FIG. 2, taking a single touch sensing region as an example, under a same display picture, by adjusting the light-emitting luminance of the light-emitting pixels in the light-emitting pixel region corresponding to the touch sensing region, different light-emitting luminance may be generated by the light-emitting pixel region. Under the different light-emitting luminance generated by the light-emitting pixel region, the mutual capacitances of the touch sensing region can be detected respectively to obtain a plurality of coordinates of the light-emitting luminance and the mutual capacitance. Here, the light-emitting luminance of the light-emitting pixel region can be calculated according to the luminance values of the plurality of light-emitting pixels contained in the light-emitting pixel region, for example, taking the average of the luminance values of the light-emitting pixels as the light-emitting luminance corresponding to the light-emitting pixel region. The mutual capacitance of the touch sensing region can be acquired through the touch module.

Figure 4:
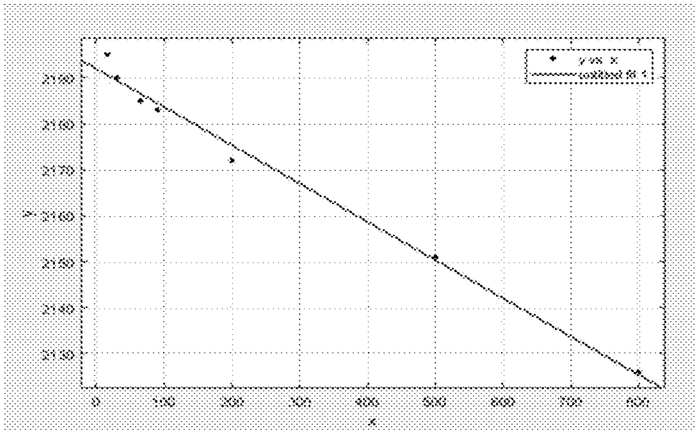
FIG. 4 is a schematic coordinate diagram of light-emitting luminance and mutual capacitance provided by an embodiment of the present application.

According to the position relationship between the coordinates, it can be determined that there is a correspondence relationship between the light-emitting luminance and the mutual capacitance. FIG. 4 illustrates a fitted curve obtained by a linear fitting of the light-emitting luminance and the mutual capacitance, with a small deviation from the various coordinate points. Therefore, it can be determined that there is a linear correspondence relationship between the light-emitting luminance and the mutual capacitance in a single touch sensing region. This linear correspondence relationship can be expressed by using the following linear function:

$$y=A*x+B;$$

wherein y is the mutual capacitance of the touch sensing region, x is the light-emitting luminance of the light-emitting pixel region corresponding to the touch sensing region, A and B are the primary term coefficient and the constant term coefficient respectively.

According to the linear correspondence relationship of the light-emitting luminance and the mutual capacitance, based on the actual mutual capacitance of a single touch sensing region, the actual light-emitting luminance of the partial display region corresponding to the single touch sensing region can be determined.

Figure 5:
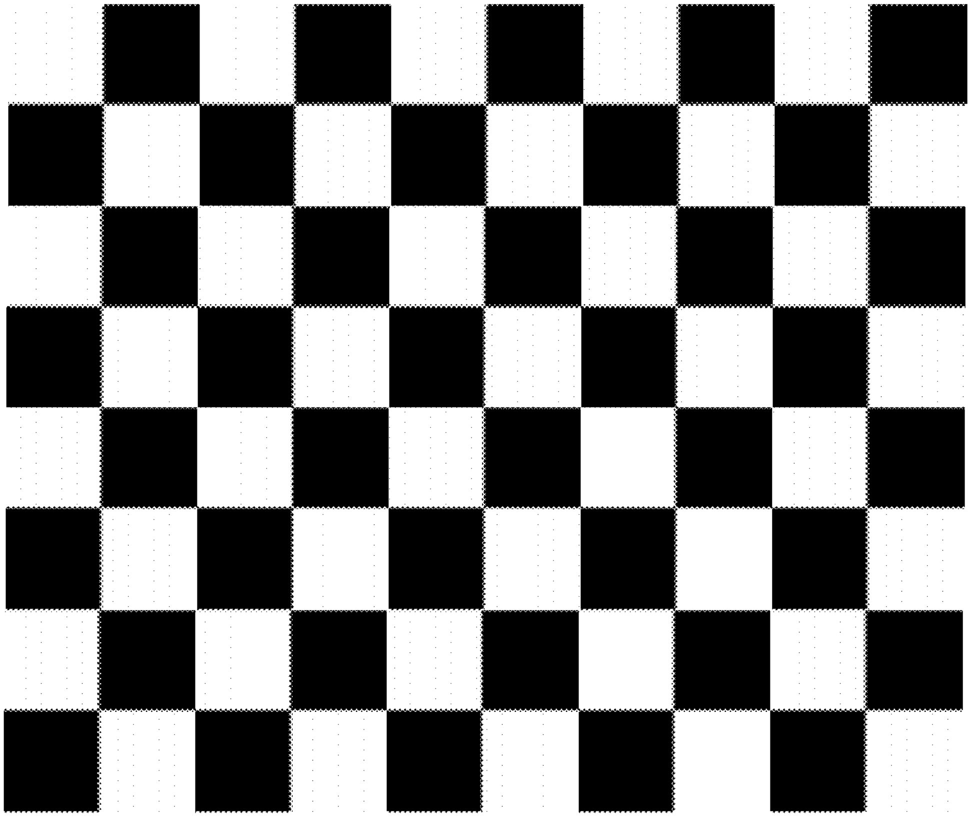
FIG. 5 is a schematic diagram of a checkerboard picture provided by an embodiment of the present application.

Similarly, when the display picture on the display panel is adjusted by the inventor, changes in the mutual capacitances of the touch sensing regions during the adjustment of the display picture may also be detected. For example, as shown in FIG. 5, a plurality of light-emitting pixels in the display panel can display a checkerboard picture, and a single checkerboard may be composed of 2*2 light-emitting pixels or of any other number of light-emitting pixels, which is not limited here.

When the display panel is driven to display a checkerboard picture, the mutual capacitances of the touch sensing regions will also change. That is, compared with the white image picture, the checkerboard picture can simulate the changes in the real picture. It can be understood that when the display panel displays the checkerboard picture, the light-emitting luminance of the light-emitting pixel regions corresponding to the touch sensing regions may be different from the light-emitting luminance of the light-emitting pixel regions corresponding to the touch sensing regions under the white image picture. Further, the light-emitting luminance of the light-emitting pixel regions under the checkerboard picture may be lower than the light-emitting luminance of the light-emitting pixel regions under the white image picture. Since there is a linear correspondence relationship between the mutual capacitance of the touch sensing region and the light-emitting luminance of the light-emitting pixel region, when the display picture changes, the mutual capacitance of the touch sensing region will change with the light-emitting luminance of the light-emitting pixel region.

When the user performs the touch operation, the mutual capacitance of the touch sensing region changes due to the touch of the user's finger. When the user does not perform the touch operation, the change of the mutual capacitance of the touch sensing region is formed due to the change of the display picture and the change of the luminance level of the picture. According to the change magnitude of the mutual capacitance of a single touch sensing region and the first correspondence relationship corresponding to the touch sensing region, the luminance change degree of the partial display region corresponding to the touch sensing region can be determined. The luminance change degree is the luminance difference between the theoretical light-emitting luminance and the actual light-emitting luminance of the partial display region under the current image picture. According to the luminance change degrees corresponding to the touch sensing regions, the targeted luminance compensation can be performed for the partial display regions corresponding to the touch sensing regions respectively. Therefore, the luminance imbalance caused by factors such as the light-emitting material difference, the IR voltage drop generated by the signal line impedance and the like may be improved, and the uniformity of the display picture may be improved.

Figure 6:
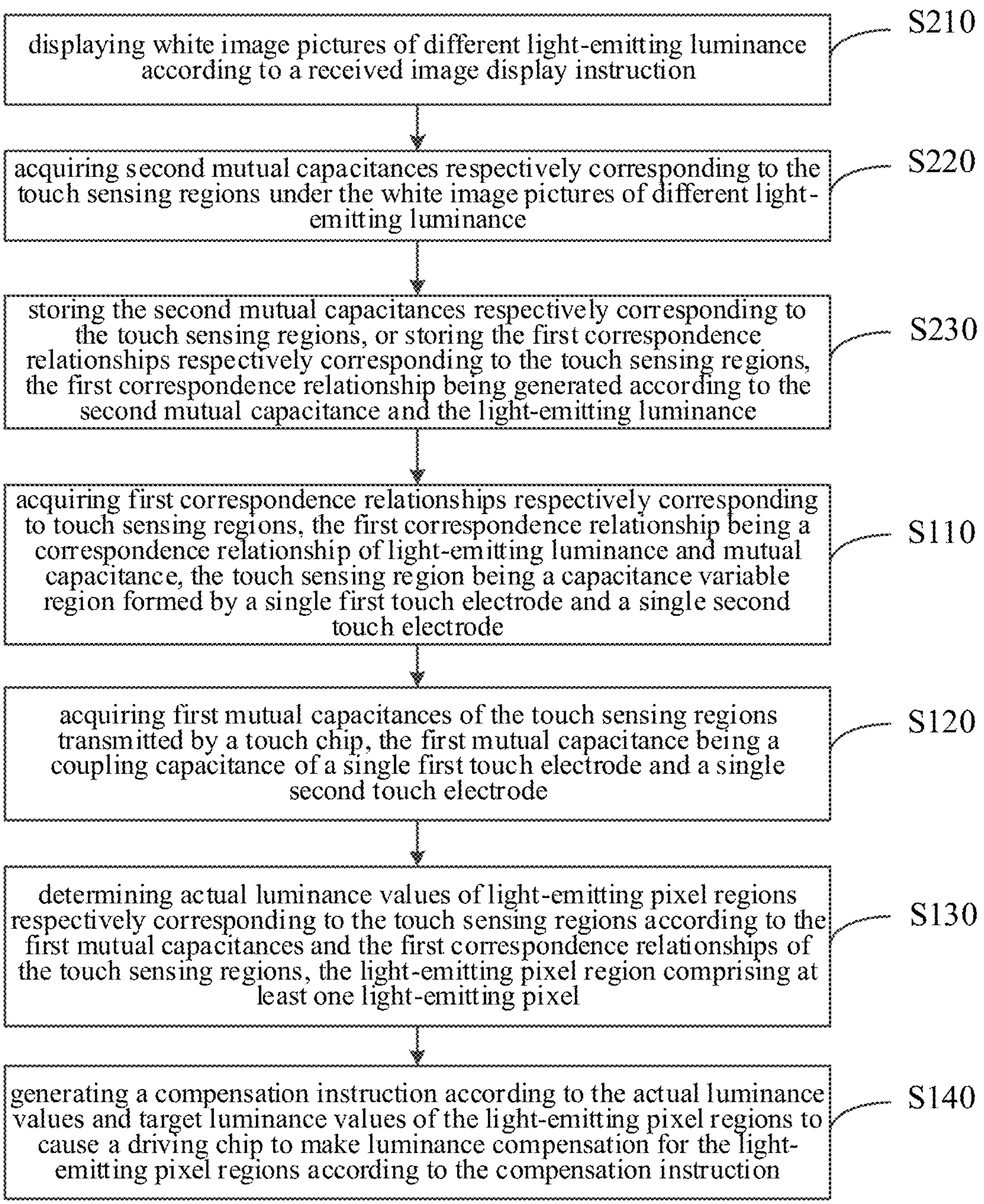
FIG. 6 is a schematic flowchart of a luminance compensation method of a display panel provided by another embodiment of the present application.

As an alternative embodiment, referring to FIG. 6, before the above S110, the method may include S210 to S230.

S210: displaying white image pictures of different light-emitting luminance according to a received image display instruction;

S220: acquiring second mutual capacitances respectively corresponding to the touch sensing regions under the white image pictures of different light-emitting luminance;

S230: storing the second mutual capacitances respectively corresponding to the touch sensing regions, or storing the first correspondence relationships respectively corresponding to the touch sensing regions, the first correspondence relationship being generated according to the second mutual capacitance and the light-emitting luminance.

Figure 7:
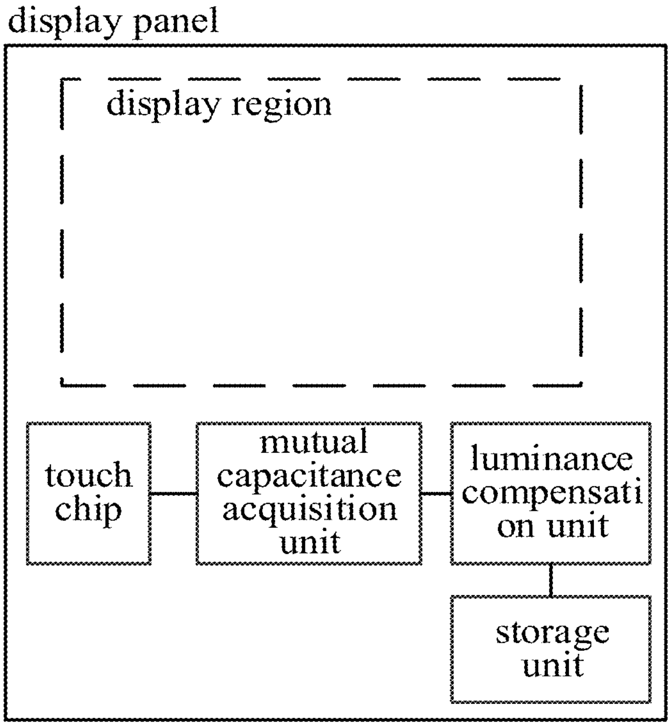
FIG. 7 is a schematic structural diagram of a display panel provided by an embodiment of the present application.

In this embodiment, during the production debugging of the display panel, the display panel can be driven by the debugging device to display the white image pictures of different light-emitting luminance. The second mutual capacitances respectively corresponding to the touch sensing regions may be acquired under the white image pictures of different light-emitting luminance. The debugging device may store the second mutual capacitances directly in the display panel, or may generate the first correspondence relationships in advance according to the second mutual capacitances of the touch sensing regions under different light-emitting luminance, and store the first correspondence relationships in the display panel. As an alternative embodiment, as shown in FIG. 7, the display panel may include a display region formed by light-emitting pixels, a touch chip electrically connected to first touch electrodes and second touch electrodes, a mutual capacitance acquisition unit, a storage unit, and a luminance compensation unit. The mutual capacitance acquisition unit may be electrically connected to the touch chip to acquire the first mutual capacitances of the touch sensing regions from the touch chip. The storage unit may store the second mutual capacitances respectively corresponding to the touch sensing regions, or may store the first correspondence relationships respectively corresponding to the touch sensing regions. The luminance compensation unit may determine the luminance compensation parameters of the light-emitting pixel regions according to the first mutual capacitances of the touch sensing regions acquired by the mutual capacitance acquisition unit and the data stored in the storage unit, and may transmit the luminance compensation parameters to the driving chip of the display panel to cause the driving chip to make luminance compensation for the light-emitting pixel regions. In another alternative embodiment, the driving chip may also be directly used as the luminance compensation unit.

In S210, the display panel needs to be powered on before each display. When the display panel is powered on, the first correspondence relationships respectively corresponding to the touch sensing regions may be acquired from the storage module, and the luminance compensation for the light-emitting pixel regions may be realized by utilizing the first correspondence relationships and the first mutual capacitances of the touch sensing regions during the display process. In order to acquire the first correspondence relationships respectively corresponding to the touch sensing regions from the storage module when the display panel is powered on, the first correspondence relationships may be pre-stored in the storage module of the display panel. The storage process of the first correspondence relationships may be in the production stage of the display panel.

In the production stage of the display panel, the display panel can be electrically connected to the debugging device, and the display panel can display the image according to the image display instruction output by the debugging device. The debugging device can output the corresponding image display instruction, so that the display panel displays the white image pictures of different light-emitting luminance according to the image display instruction.

In S220, when the white image pictures of different light-emitting luminance are displayed on the display panel, the second mutual capacitances respectively corresponding to the touch sensing regions under different light-emitting luminance can be acquired.

When the display panel is controlled to display the white image pictures, the second mutual capacitances respectively corresponding to the touch sensing regions may be received from the touch chip. For example, the display panel displays the white image pictures of 10 light-emitting luminance, and the display panel includes 300 touch sensing regions. Under the white image picture of each light-emitting luminance, the second mutual capacitances respectively corresponding to 300 touch sensing regions can be acquired from the touch chip. After acquiring the second mutual capacitances under all light-emitting luminance, for each touch sensing region, 10 second mutual capacitances respectively corresponding to 10 different light-emitting luminance can be acquired.

It should be noted that the above debugging device drives the display panel to display the white image pictures of different light-emitting luminance, which can be the Gamma debugging stage of the display panel. In the Gamma debugging stage, the light-emitting pixels of the same color in the display panel share the same Gamma register value. The luminance and color coordinates of the partial display region in the display panel can be acquired by the optical device. By adjusting the Gamma register value of the light-emitting pixels of different colors, the luminance and color coordinates can meet the target light-emitting luminance. At the same time, the second mutual capacitances respectively corresponding to the touch sensing regions can also be acquired from the touch chip.

In S230, when the debugging device controls the display panel to display the white image pictures of different light-emitting luminance, the display panel can acquire the second mutual capacitances respectively corresponding to the touch sensing regions under different light-emitting luminance, and store the second mutual capacitances in the storage module of the display panel. At this time, the second mutual capacitances respectively corresponding to the touch sensing regions are stored in the storage module.

In another alternative embodiment, after acquiring the second mutual capacitances respectively corresponding to the touch sensing regions under different light-emitting luminance, the display panel may also transmit the second mutual capacitances to the debugging device. After acquiring the second mutual capacitances respectively corresponding to the touch sensing regions under different light-emitting luminance, for each touch sensing region, the debugging device may fit the second mutual capacitances respectively corresponding to different light-emitting luminance, to obtain the first correspondence relationship between the light-emitting luminance and the second mutual capacitance.

After fitting the light-emitting luminance and the second mutual capacitances of the touch sensing regions, the first correspondence relationships respectively corresponding to the touch sensing regions may be obtained. At this time, the debugging device may also transmit the first correspondence relationships to the display panel, so that the display panel stores the first correspondence relationships respectively corresponding to the touch sensing regions.

It should be noted that the data stored in the display panel may be the second mutual capacitances respectively corresponding to the touch sensing regions under different light-emitting luminance, or may be the first correspondence relationships between the different light-emitting luminance and the second mutual capacitances of the touch sensing regions. If the display panel stores the first correspondence relationships, the first correspondence relationships may be acquired from the storage module at each time the display panel is powered on. When the display panel is normally displayed, the first mutual capacitances of the touch sensing regions may be acquired through the touch chip, and the current actual luminance values of the touch sensing regions may be determined according to the first mutual capacitances and the first correspondence relationships of the touch sensing regions. The display panel may determine the target luminance values of the touch sensing regions according to the image data, and may determine the luminance difference between the target luminance and the actual luminance of the touch sensing regions according to the difference between the actual luminance values and the target luminance values.

If the display panel stores the second mutual capacitances, the second mutual capacitances may be acquired from the storage module at each time the display panel is powered on. The second mutual capacitances respectively corresponding to the touch sensing regions under different light-emitting luminance may be fitted to obtain the first correspondence relationships of the touch sensing regions. After fitting to obtain the first correspondence relationships, the luminance difference of the touch sensing regions may be determined according to the first correspondence relationships and the first mutual capacitances.

From the above analysis, it is clear that the first correspondence relationships can be stored in the display panel, or the second mutual capacitances can be stored in the display panel. If the second mutual capacitances are stored, the display panel needs to obtain the first correspondence relationships by fitting the second mutual capacitances at each time the display panel is powered on. If the first correspondence relationships are stored, the display panel can acquire the first correspondence relationships and determine the luminance difference according to the first correspondence relationships and the first mutual capacitances of the touch sensing regions, thereby performing the luminance compensation.

As an alternative embodiment, in the above implementation of generating the first correspondence relationships, according to the second mutual capacitances respectively corresponding to the touch sensing regions under different light-emitting luminance, slopes and intercepts of linear fit functions respectively corresponding to the touch sensing regions are obtained by linearly fitting the light-emitting luminance and the second mutual capacitances.

In this embodiment, in the implementation of generating the first correspondence relationships, according to the second mutual capacitances respectively corresponding to the touch sensing regions under different light-emitting luminance, the slopes and the intercepts of the linear fit functions may be obtained by linearly fitting the light-emitting luminance and the second mutual capacitances, with the light-emitting luminance being used as the independent variable and the second mutual capacitances being used as the dependent variable. For each touch sensing region, a linear fit function corresponding to the touch sensing region can be obtained by fitting according to the second mutual capacitances under different light-emitting luminance. That is, for each touch sensing region, the slope and the intercept of the corresponding linear fit function can be obtained by linearly fitting. The slope and the intercept are the fitting coefficients of the first correspondence relationship.

For example, the display panel includes 300 touch sensing regions, and the display panel displays the white image pictures of 10 light-emitting luminance. Storing the first correspondence relationships respectively corresponding to the touch sensing regions may include storing the slopes and the intercepts respectively corresponding to the 300 touch sensing regions. Further, storing the second mutual capacitances respectively corresponding to the touch sensing regions may include storing 10 second mutual capacitances respectively corresponding to each of the 300 touch sensing regions under 10 light-emitting luminance.

It should be noted that in the process of verifying the mutual capacitances of the touch sensing regions affected by the display picture and the display luminance, the inventor determines that the fitting mode of the light-emitting luminance and the mutual capacitances can be linear fitting according to the changing trend of the mutual capacitances under different light-emitting luminance. In the linear fitting mode, the linear fit function of the light-emitting luminance and the mutual capacitances is a primary polynomial, and the primary term coefficients (slopes) and the constant term coefficients (intercepts) of the primary polynomials respectively corresponding to the touch sensing regions may be stored in the display panel as the first correspondence relationships of the touch sensing regions.

As an alternative embodiment, the fit function of the light-emitting luminance and the mutual capacitances may also be polynomial fitting of quadratic terms, or polynomial fitting of cubic or higher terms. Taking the polynomial fitting of quadratic terms as an example, the polynomial fitting formula includes quadratic term coefficients, primary term coefficients and constant term coefficients. At this time, the display panel can store the quadratic term coefficients, the primary term coefficients and the constant term coefficients of the quadratic term fit function as the first correspondence relationships of the touch sensing regions.

Figure 8:
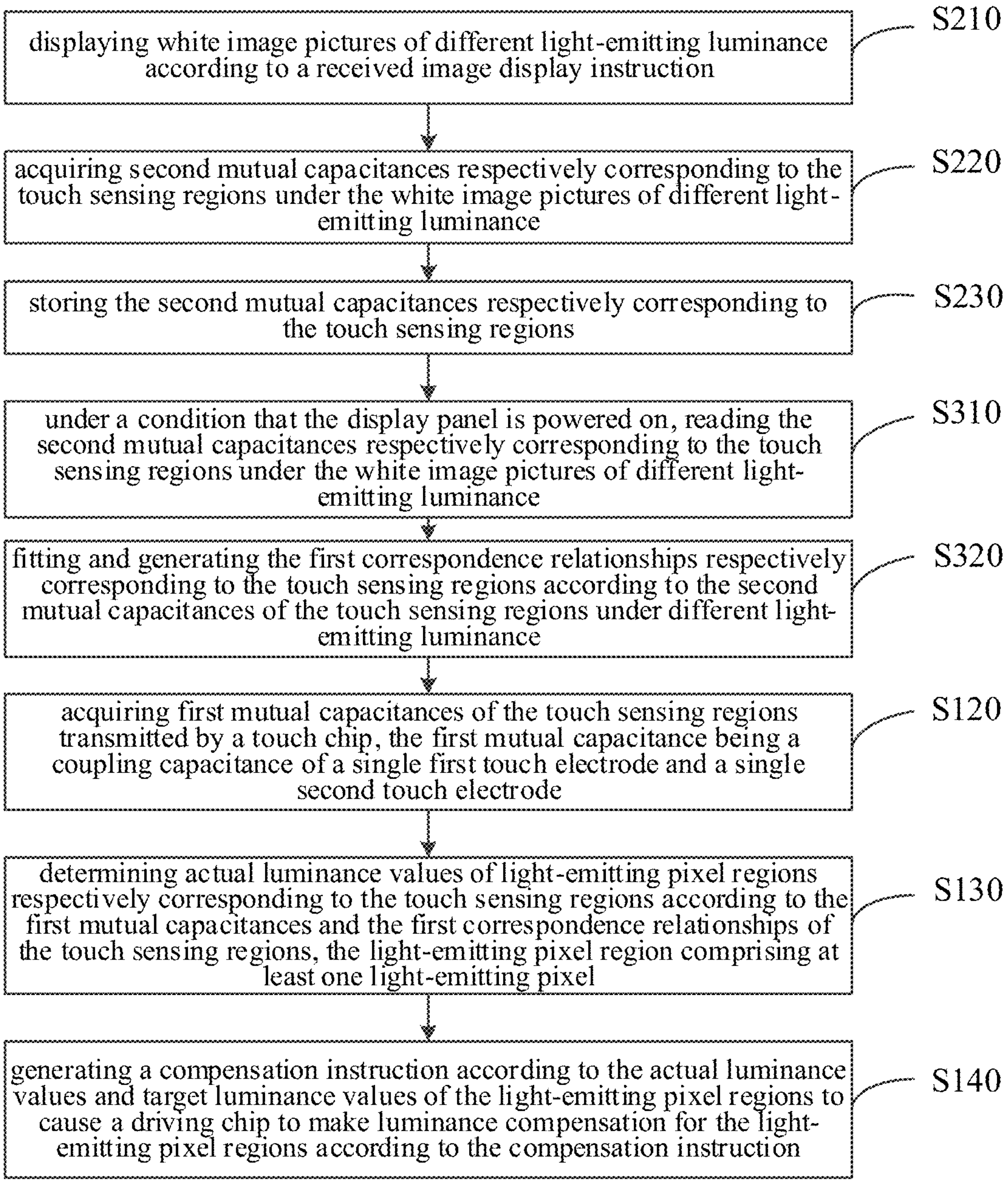
FIG. 8 is a schematic flowchart of a luminance compensation method of a display panel provided by another embodiment of the present application.

As an alternative embodiment, referring to FIG. 8, the above S110 may include S310 to S320.

S310: under a condition that the display panel is powered on, reading the second mutual capacitances respectively corresponding to the touch sensing regions under the white image pictures of different light-emitting luminance;

S320: fitting and generating the first correspondence relationships respectively corresponding to the touch sensing regions according to the second mutual capacitances of the touch sensing regions under different light-emitting luminance.

In this embodiment, when the display panel stores the second mutual capacitances in the storage module, the second mutual capacitances of the touch sensing regions under different light-emitting luminance can be read at each time the display panel is powered on, and the light-emitting luminance and the second mutual capacitances may be fitted to obtain the first correspondence relationships corresponding to the touch sensing regions.

In S310, after the display panel displays the white image pictures, the stored data is the second mutual capacitances. At each time the display panel is powered on, the display panel may read the second mutual capacitances respectively corresponding to the touch sensing regions under the white image pictures of different light-emitting luminance from the storage module.

In S320, after acquiring the second mutual capacitances corresponding to the touch sensing regions under different light-emitting luminance, the display panel may linearly fit the light-emitting luminance and the second mutual capacitances, with the light-emitting luminance being used as the independent variable and the second mutual capacitances being used as the dependent variable. This linear fitting mode is similar to the linear fitting mode described in the above embodiments, and will not be repeated here.

The storage module of the display panel configured to store the second mutual capacitances may be a non-volatile memory, such as a read-only memory (ROM), an electrically erasable programmable read-only memory (EEPROM), or a flash memory, and the like. When the display panel is powered on, the second mutual capacitances can be read from the non-volatile memory, and after obtaining the first correspondence relationships by linearly fitting, the first correspondence relationships may be stored in a volatile memory. The volatile memory can be a static random access memory (SRAM), a dynamic random access memory (DRAM), a random access memory (RAM), and the like. In a single powered on process, the display panel can quickly obtain the first correspondence relationships from the volatile memory, thereby improving the luminance compensation efficiency of the display panel. After the powered on process, the first correspondence relationships stored in the volatile memory is lost due to power failure and needs to be written again at the next time.

In S120, the display panel can acquire first mutual capacitances respectively corresponding to the touch sensing regions from the touch chip during display. Each touch sensing region corresponds to a first touch electrode and a second touch electrode, and the first mutual capacitance of each touch sensing region is the coupling capacitance formed by a single first touch electrode and a single second touch electrode corresponding to the touch sensing region.

In S130, after acquiring the first mutual capacitances respectively corresponding to the touch sensing regions by the display panel, according to the first correspondence relationships of the touch sensing regions, the first mutual capacitances can be substituted into the first correspondence relationships respectively, thereby obtaining the actual luminance values respectively corresponding to the touch sensing regions.

The display region of the display panel may be divided into a plurality of touch sensing regions according to a plurality of first touch electrodes and a plurality of second touch electrodes, and the display region of the display panel may be formed by a plurality of light-emitting pixels arranged in an array or other arrangement modes. Thus, each touch sensing region may correspond to a light-emitting pixel region formed by a part of the light-emitting pixels. The actual luminance value corresponding to each touch sensing region is the overall actual luminance value of the light-emitting pixel region corresponding to the touch sensing region.

The number of the light-emitting pixels in the display panel is large, and the number of the touch sensing regions each formed by two touch electrodes is small. Therefore, the light-emitting pixel region corresponding to each touch sensing region shall include at least one light-emitting pixel. It can be understood that the light-emitting pixel region corresponding to each touch sensing region may include a plurality of light-emitting pixels arranged in an array.

In S140, after determining the actual luminance values of the light-emitting pixel regions corresponding to the touch sensing regions according to the first mutual capacitances of the touch sensing regions, the display panel may acquire the target luminance values of the light-emitting pixel regions. In an alternative embodiment, the display panel acquires the target luminance values of the light-emitting pixel regions by determining the theoretical luminance values of the light-emitting pixels under the currently displayed image picture based on the gray scale values and the current luminance levels of the light-emitting pixels in the currently displayed image picture. For each light-emitting pixel region, the target luminance value of the light-emitting pixel region may be determined by calculating the average value of the theoretical luminance values of the light-emitting pixels in the light-emitting pixel region, or the median value of the theoretical luminance values of the light-emitting pixels may be used as the target luminance value of the luminance pixel region, or the target luminance value of the light-emitting pixel region may be determined by calculating the weights of the theoretical luminance values, which is not limited here.

According to the target luminance value and the actual luminance value of each light-emitting pixel region, the luminance difference of the light-emitting pixel region when it is actually displayed may be determined, and a corresponding compensation instruction may be generated based on the luminance difference. The luminance difference of each light-emitting pixel region may be included in the compensation instruction.

After generating the compensation instruction, the compensation instruction may be transmitted to the driving chip of the display panel. The driving chip may make luminance compensation for the light-emitting pixels of the light-emitting pixel regions according to the received compensation instruction.

Taking a single touch sensing region as an example, after determining the actual luminance value of the light-emitting pixel region corresponding to the touch sensing region, the target luminance values of the light-emitting pixels in the light-emitting pixel region may be determined according to the gray scale values and the current luminance levels of the light-emitting pixels. According to the target luminance values of the light-emitting pixels in the light-emitting pixel region, the target luminance value corresponding to the light-emitting pixel region can be calculated. In an alternative embodiment, the target luminance value of a single light-emitting pixel can be calculated by the following formula:

$$Lv = (\text{Gray}/\text{Gray}_{max})^{Gamma} * L_{max};$$

wherein Lv is the luminance value of the light-emitting pixel, Gray is the gray scale value, $\text{Gray}_{max}$ is the maximum gray scale value, Gamma is the Gamma parameter, and Lm is the maximum luminance value corresponding to the current luminance level.

In the embodiment given, when the maximum luminance value of the current luminance level is 500 nit, the Gamma parameter is 2.2, and the maximum gray scale value is 255, the formula for calculating the luminance of the light-emitting pixel may be:

$$Lv1 = (\text{Gray}_x/255)^{2.2} * 500.$$

According to the current gray scale values of the light-emitting pixels in the light-emitting pixel region, the target luminance values of the light-emitting pixels may be calculated. The target luminance value of each light-emitting pixel region can be calculated by the target luminance values of the light-emitting pixels included in the light-emitting pixel region. Based on the target luminance value and the actual luminance value of each light-emitting pixel region, a compensation magnitude of the luminance compensation for the light-emitting pixel region may be determined. After generating a compensation instruction from the compensation amplitudes of the light-emitting pixel regions, the compensation instruction may be transmitted to the driving chip, to cause the driver chip to make gray scale luminance compensation for the light-emitting pixel regions according to the compensation instruction. For example, for a single light-emitting pixel, when the luminance compensation is made to increase the light-emitting luminance, the driving chip may increase the gray scale values of the light-emitting pixels according to the compensation amplitude, thereby realizing the luminance increasing compensation; when the luminance compensation is made to decrease the light-emitting luminance, the driving chip may reduce the gray scale values of the light-emitting pixels according to the compensation amplitude, thereby realizing the luminance decreasing compensation. The plurality of light-emitting pixels within the same light-emitting pixel region may correspond to the same compensation amplitude.

In the above embodiment, during the production of each display panel, the second mutual capacitances corresponding to the touch sensing regions may be recorded by displaying white image pictures of different light-emitting luminance, and the first correspondence relationships corresponding to the touch sensing regions may be determined according to the second mutual capacitances of the touch sensing regions. During the display of the display panel, the targeted luminance compensation may be made for the touch sensing regions according to the first correspondence relationships respectively. Compared to the sampling compensation method of selecting panel samples from the same batch of display panels for debugging and applying the compensation data obtained after debugging to all display panels of the same batch, in the embodiments of the present application, the first correspondence relationships stored in each display panel may correspond to the light-emitting pixel regions of the display panel. By making luminance compensation according to the first correspondence relationships and the first mutual capacitances obtained in the actual display, the targeted compensation may be made for each display panel, thereby avoiding affecting the luminance compensation effect due to differences between the display panels of the same batch when the same compensation data is used.

Figure 9:
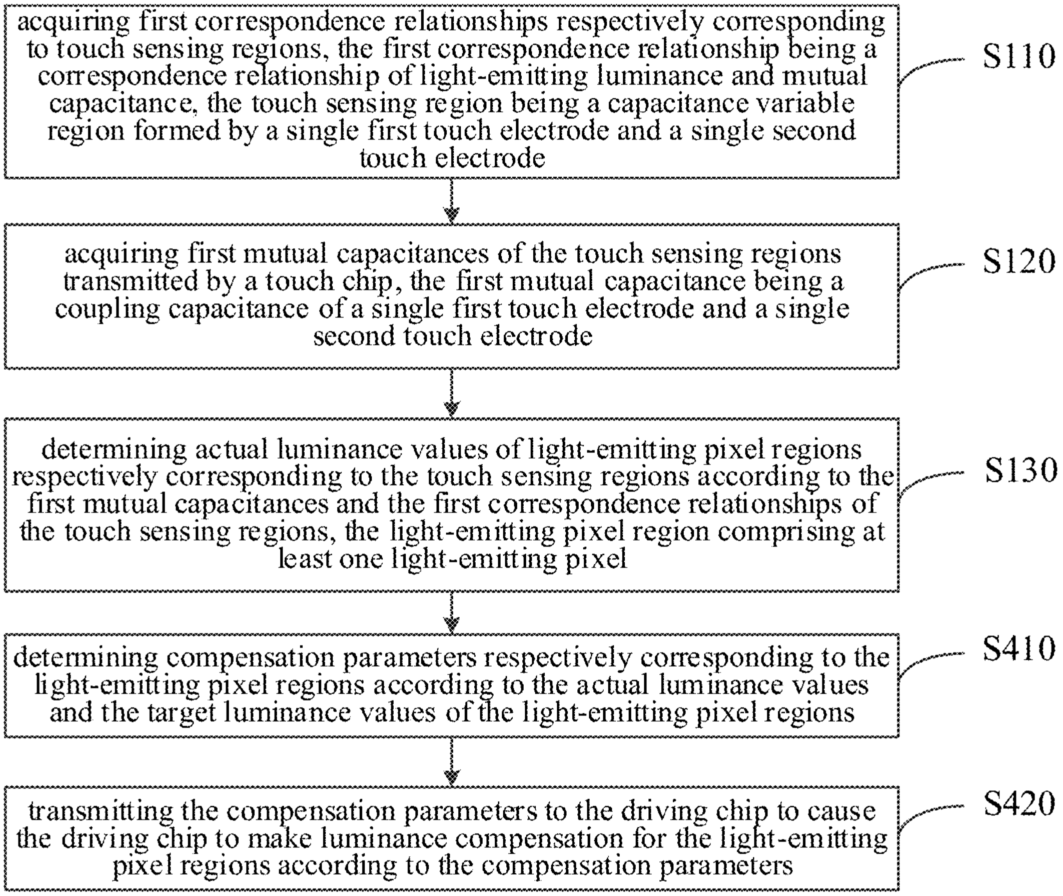
FIG. 9 is a schematic flowchart of a luminance compensation method of a display panel provided by another embodiment of the present application.

As an alternative embodiment, referring to FIG. 9, the above S140 may include S410 to S420.

S410: determining compensation parameters respectively corresponding to the light-emitting pixel regions according to the actual luminance values and the target luminance values of the light-emitting pixel regions;

S420: transmitting the compensation parameters to the driving chip to cause the driving chip to make luminance compensation for the light-emitting pixel regions according to the compensation parameters.

In this embodiment, after the actual luminance values of the light-emitting pixel regions are determined according to the first mutual capacitances the first correspondence relationships of the touch sensing regions, the display panel may determine the target luminance values of the light-emitting pixels in the light-emitting pixel regions according to the current gray scale values of the light-emitting pixels, and then calculate the target luminance values of the light-emitting pixel regions according to the target luminance values of the light-emitting pixels contained in the light-emitting pixel regions. The compensation parameters of the light-emitting pixel regions can be determined according to the luminance difference between the actual luminance values and the target luminance values, and the driving chip may be controlled to make luminance compensation for the light-emitting pixel regions according to the compensation parameters, thereby realizing the targeted differentiated luminance compensation for the light-emitting pixel regions.

In S410, after determining the actual luminance values and the target luminance values corresponding to the light-emitting pixel regions, corresponding compensation parameters may be determined according to the actual luminance values and the target luminance values of the light-emitting pixel regions, and the compensation parameters can indicate the luminance difference between the actual luminance values and the target luminance values.

In S420, after determining the compensation parameters respectively corresponding to the light-emitting pixel regions, the compensation parameters may be transmitted to the driving chip. After receiving the compensation parameters respectively corresponding to the light-emitting pixel regions, the driving chip may perform luminance compensation for the light-emitting pixels in the light-emitting pixel regions according to the compensation parameters corresponding to the light-emitting pixel regions.

As an alternative embodiment, the above S410 may include:

determining luminance compensation gains of the light-emitting pixel regions according to ratios of the target luminance values to the actual luminance values of the light-emitting pixel regions.

In this embodiment, compensation parameters for indicating the luminance difference between the actual luminance values and the target luminance values may be luminance compensation gains. The luminance compensation gains can be the ratios of the target luminance values to the actual luminance values. After determining the target luminance values and actual luminance values of the light-emitting pixel regions, the ratios of the target luminance values to the actual luminance values of the light-emitting pixel regions can be calculated respectively, and the ratios may be used as the luminance compensation gains corresponding to the light-emitting pixel regions.

In an alternative embodiment, for a single light-emitting pixel region, when the target luminance value of the light-emitting pixel region is 120 nit and the actual luminance value is 100 nit, the ratio of the target luminance value to the actual luminance value is 1.2, and the luminance compensation gain of the light-emitting pixel region is 1.2.

Figure 10:
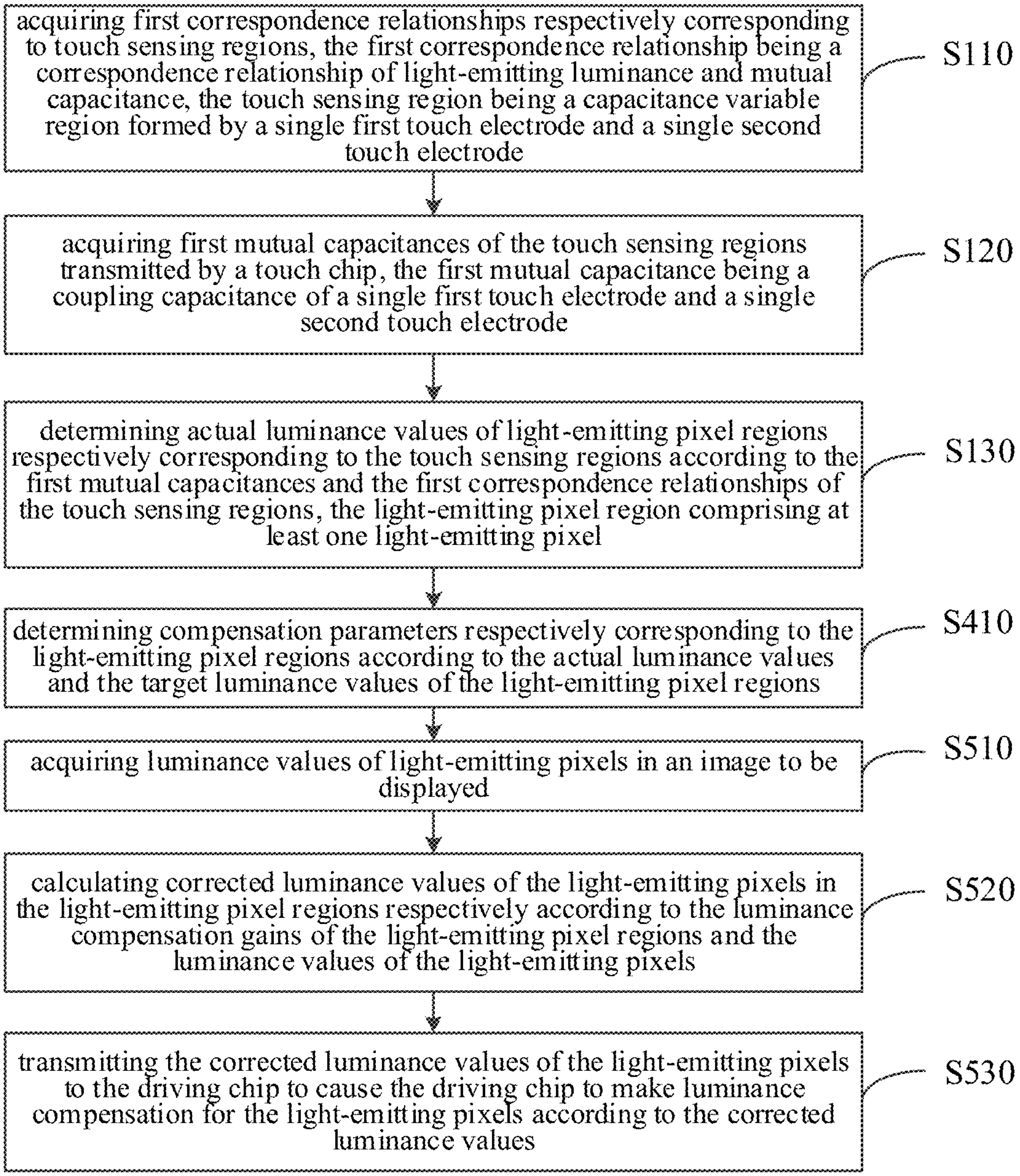
FIG. 10 is a schematic flowchart of a luminance compensation method of a display panel provided by another embodiment of the present application.

As an alternative embodiment, referring to FIG. 10, the above S420 may include S510 to S530.

S510: acquiring luminance values of light-emitting pixels in an image to be displayed;

S520: calculating corrected luminance values of the light-emitting pixels in the light-emitting pixel regions respectively according to the luminance compensation gains of the light-emitting pixel regions and the luminance values of the light-emitting pixels;

S530: transmitting the corrected luminance values of the light-emitting pixels to the driving chip to cause the driving chip to make luminance compensation for the light-emitting pixels according to the corrected luminance values.

In this embodiment, when the display panel displays an image, the image to be displayed may be acquired, and the corrected luminance values of the light-emitting pixels may be calculated according to the luminance values of the light-emitting pixels and the luminance compensation gain of the light-emitting pixel region to which the light-emitting pixels belong. Further, the driving chip may be controlled to make luminance compensation for the light-emitting pixels according to the corrected luminance values of the light-emitting pixels.

In S510, during the display of the display panel, while displaying the current image, the display image after the current image may be acquired, and these images not yet displayed are images to be displayed. For a single image to be displayed, the luminance values of the light-emitting pixels in the image to be displayed can be acquired before the image to be displayed is displayed.

In S520, after acquiring the luminance values of the light-emitting pixels according to the image data of the image to be displayed, the luminance compensation gains corresponding to the light-emitting pixel regions may be determined according to the light-emitting pixel regions to which the light-emitting pixels belong. The corrected luminance values of the light-emitting pixels can be determined based on the actual luminance values of the light-emitting pixels and the luminance compensation gains corresponding to the light-emitting pixel regions to which the light-emitting pixels belong.

As an alternative embodiment, the corrected luminance value of the luminescent pixel may be a product of the actual luminance value and the luminance compensation gain. Taking a single light-emitting pixel as an example, when the luminance value of the light-emitting pixel is 90 nit and the luminance compensation gain of the light-emitting pixel region where the light-emitting pixel is located is 1.2, the corrected luminance value of the light-emitting pixel can be calculated as 108 nit.

In an exemplarity embodiment, for a light-emitting pixel a in a single the light-emitting pixel region, the actual luminance value of the light-emitting pixel a is 90 nit. When the luminance compensation gain of the light-emitting pixel region is 1.2, the corrected luminance value of the light-emitting pixel a is 108 nit.

According to the above formula for calculating the luminance of the light-emitting pixel:

$$Lv1 = (\text{Gray } a/\text{Gray}_{max})^{Gamma} * L_{max};$$

$$Lv2 = (\text{Gray } a'/\text{Gray}_{max})^{Gamma} * L_{max};$$

wherein Lv1 is the actual luminance value of the light-emitting pixel a, Lv2 is the corrected luminance value of the light-emitting pixel a, Gray a is the gray scale value corresponding to the actual luminance value, and Gray a' is the gray scale value corresponding to the corrected luminance value.

According to the above formula, the following can be obtained:

$$Lv1/Lv2 = (\text{Gray } a/\text{Gray}_{max})^{Gamma}/(\text{Gray } a'/\text{Gray}_{max})^{Gamma} = (\text{Gray } a/\text{Gray } a')^{Gamma};$$

that is, $$Lv1/Lv2 = (\text{Gray } a/\text{Gray } a')^{Gamma};$$

Since the actual luminance value Lv1 of the light-emitting pixel a, the corrected luminance value Lv2, the current gray scale value Gray a, and the Gamma parameters of the display panel are known, the gray scale value a' corresponding to the corrected luminance value may be obtained by substituting the above values.

After determining the gray scale value a' corresponding to the corrected luminance value, the driving chip of the display panel can acquire the corresponding data voltage according to the gray scale value a', and provide the data voltage for the light-emitting pixel a to achieve the luminance compensation of the light-emitting pixel a.

Similarly, for other light-emitting pixels in the same light-emitting pixel region, since the luminance compensation gain is the same, the corrected gray scale values of the light-emitting pixels may be determined according to the actual luminance values, the corrected luminance values and the current gray scale values of the light-emitting pixels. Further, the data voltages corresponding to the corrected gray scale values can be provided for the light-emitting pixels to realize the luminance compensation of the light-emitting pixel region.

Figure 11:
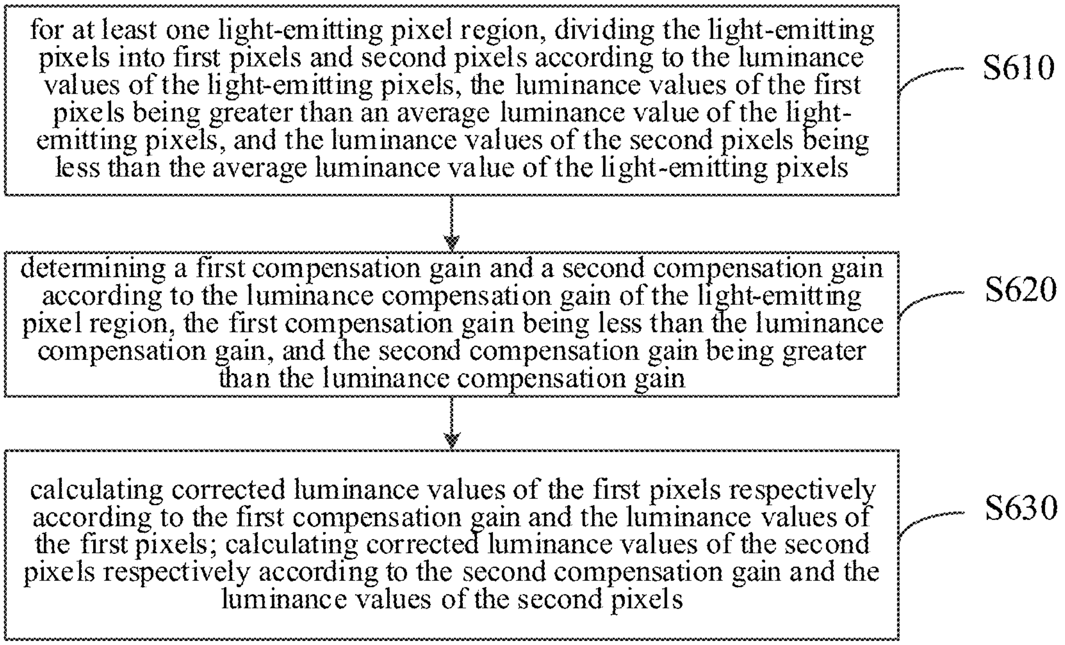
FIG. 11 is a schematic flowchart of a refinement process of S520 in the luminance compensation method of the display panel provided by an embodiment of the present application.

As an alternative embodiment, referring to FIG. 11, the above S520 may include S610 to S630.

S610: for at least one light-emitting pixel region, dividing the light-emitting pixels into first pixels and second pixels according to the luminance values of the light-emitting pixels, the luminance values of the first pixels being greater than an average luminance value of the light-emitting pixels, and the luminance values of the second pixels being less than the average luminance value of the light-emitting pixels;

S620: determining a first compensation gain and a second compensation gain according to the luminance compensation gain of the light-emitting pixel region, the first compensation gain being less than the luminance compensation gain, and the second compensation gain being greater than the luminance compensation gain;

S630: calculating corrected luminance values of the first pixels respectively according to the first compensation gain and the luminance values of the first pixels; calculating corrected luminance values of the second pixels respectively according to the second compensation gain and the luminance values of the second pixels.

In this embodiment, for a single light-emitting pixel region, the light-emitting pixels can be divided into the first pixels and the second pixels, wherein the luminance values of the first pixels are large and the luminance values of the second pixels are small. For the first pixels, the luminance compensation may be performed by using the lower first compensation gain, and for the second pixels, the luminance compensation may be performed by using the higher second compensation gain. By compensating the first pixels and the second pixels separately with different luminance gains, the compensated luminance difference between the first pixels and the second pixels can be reduced, so that the luminance inequality after the luminance compensation can be improved.

Figure 12:
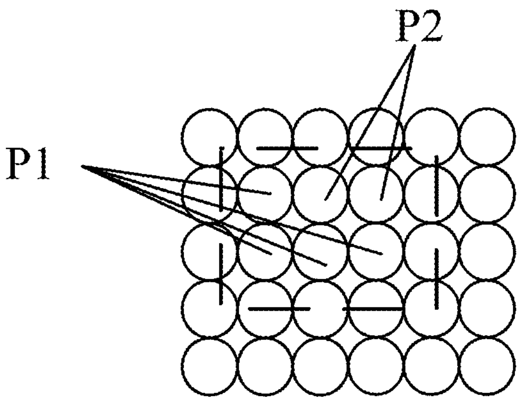
FIG. 12 is a schematic diagram of a light-emitting pixel region provided by an embodiment of the present application.

In S610, for at least one light-emitting pixel region of the light-emitting pixel regions, according to the luminance values of the light-emitting pixels in the light-emitting pixel region, the light-emitting pixels may be divided into the first pixels and the second pixels. Referring to FIG. 12, as an optional division method, 2*3 light-emitting pixels may be included in a single light-emitting pixel region, and the average luminance value of the light-emitting pixel region may be determined according to the luminance values of six light-emitting pixels. As shown in FIG. 12, after determining the average luminance value, four light-emitting pixels with a luminance value greater than the average luminance value can be taken as the first pixels P1, and two light-emitting pixels with a luminance value less than the average luminance value can be taken as the second pixels P2. The number of the light-emitting pixels in the light-emitting pixel regions may be different, and for each light-emitting pixel region, the light-emitting pixels in the light-emitting pixel region may be divided into the first pixels and the second pixels according to the average luminance value of the light-emitting pixel region.

In an alternative embodiment, the above dividing method of the first pixels and the second pixels may calculate the average luminance values of the light-emitting pixels in the light-emitting pixel region based on the luminance values of the light-emitting pixels. The light-emitting pixels with a luminance value greater than the average luminance value can be taken as the first pixels, and the light-emitting pixels with a luminance value less than the average luminance value can be taken as the second pixels.

In another alternative embodiment, the dividing method of the first pixels and the second pixels may further determine the median luminance value based on the luminance values of the light-emitting pixels. The light-emitting pixels with a luminance value greater than the median luminance value can be taken as the first pixels, and the light-emitting pixels with a luminance value less than the median luminance value can be taken as the second pixels.

In other alternative embodiments, the division of the light-emitting pixels can also be realized by combining one or more of mode, weighted average, and mean calculation after removing extreme values.

In S620, for a single light-emitting pixel region, the luminance values of the light-emitting pixels in the light-emitting pixel region are not completely consistent. If the same luminance compensation gain is used to compensate the light-emitting pixels, then the luminance compensation amplitude of the light-emitting pixels having a higher luminance value may be large, while the luminance compensation amplitude of the light-emitting pixels having a lower luminance value may be small. At this time, the luminance difference between the light-emitting pixels in the same light-emitting pixel region will enlarge, resulting in uneven luminance in the light-emitting pixel region. In order to improve the uneven luminance of the light-emitting pixels in the light-emitting pixel region after luminance compensation, appropriate luminance compensation can be performed separately after dividing the light-emitting pixels into the first pixels and the second pixels.

Taking a single light-emitting pixel as an example, after determining the luminance compensation gain of the light-emitting pixel, the first compensation gain and the second compensation gain may also be determined according to the luminance compensation gain. The first compensation gain may be less than the luminance compensation gain, and the second compensation gain may be greater than the luminance compensation gain. For example, when the luminance compensation gain is 1.2, it may be determined that the first compensation gain and the second compensation gain are 1.1 and 1.3, respectively.

In an alternative embodiment, after determining the luminance compensation gain, the first compensation gain and the second compensation gain may also be calculated according to a relevant calculation formula. The calculation formula may be related to the target luminance value of the light-emitting pixel region, and may be related to the average luminance value of the first pixels and the average luminance value of the second pixels. For example, the ratio of the average luminance value of the first pixels to the target luminance value can be calculated, and the first compensation gain may be determined according to the luminance compensation gain and the ratio. In one embodiment, the ratio of the average luminance value of the first pixels to the target luminance value is 1.2, the ratio of the average luminance value of the second pixels to the target luminance value is 0.8, and the luminance compensation gain is 1.2. It can be calculated that the first luminance gain is 1 and the second luminance gain is 1.5.

In S630, after determining the first compensation gain and the second compensation gain, the corrected luminance values of the first pixels may be calculated according to the luminance values of the first pixels and the first compensation gain. Further, the corrected luminance values corresponding to the second pixels may be calculated according to the luminance values of the second pixels and the second compensation gain.

In an alternative embodiment, the corrected luminance value of the first pixel may be a product of the luminance value of the first pixel and the first compensation gain, and the corrected luminance value of the second pixel may be a product of the luminance value of the second pixel and the second compensation gain.

As an alternative embodiment, the perception of the human eye is more obvious at lower luminance than at higher luminance. Under the lower luminance, when the same luminance compensation gain is used to compensate the light-emitting pixels in the same light-emitting pixel region, the luminance compensation amplitude of the light-emitting pixels with higher luminance will be larger, thus increasing the luminance difference between the light-emitting pixels with higher luminance and the light-emitting pixels with lower luminance in the same light-emitting pixel region. Because the user's perception at lower luminance is more sensitive, when the luminance difference increases, the phenomenon of uneven brightness will be perceived, resulting in a poor display effect. Therefore, when the display panel displays under lower luminance, the light-emitting pixels in the same light-emitting pixel region can be divided into the first pixels and the second pixels by the division method in the above embodiment, and different compensation gains may be used to compensate, so as to reduce the luminance difference of the light-emitting pixels in the same light-emitting pixel region after compensation.

Under a condition that the display panel displays under higher luminance, the user does not obviously perceive the luminance change at the higher luminance. When the same luminance compensation gain is used to compensate in the same light-emitting pixel region, the increased luminance difference of the light-emitting pixels after compensation will not be perceived by the user. At this time, in order to reduce the compensation calculation amount, the same luminance compensation gain can be applied to the light-emitting pixels in the same light-emitting pixel region.

In S530, after calculating the corrected luminance values of the light-emitting pixels, the corrected luminance values of the light-emitting pixels may be transmitted to the driving chip. After receiving the corrected luminance values, the driving chip may generate a corresponding data signal according to the corrected luminance values of the light-emitting pixels, and drive the light-emitting pixels to emit light, thereby realizing the luminance compensation of the image to be displayed.

Figure 13:
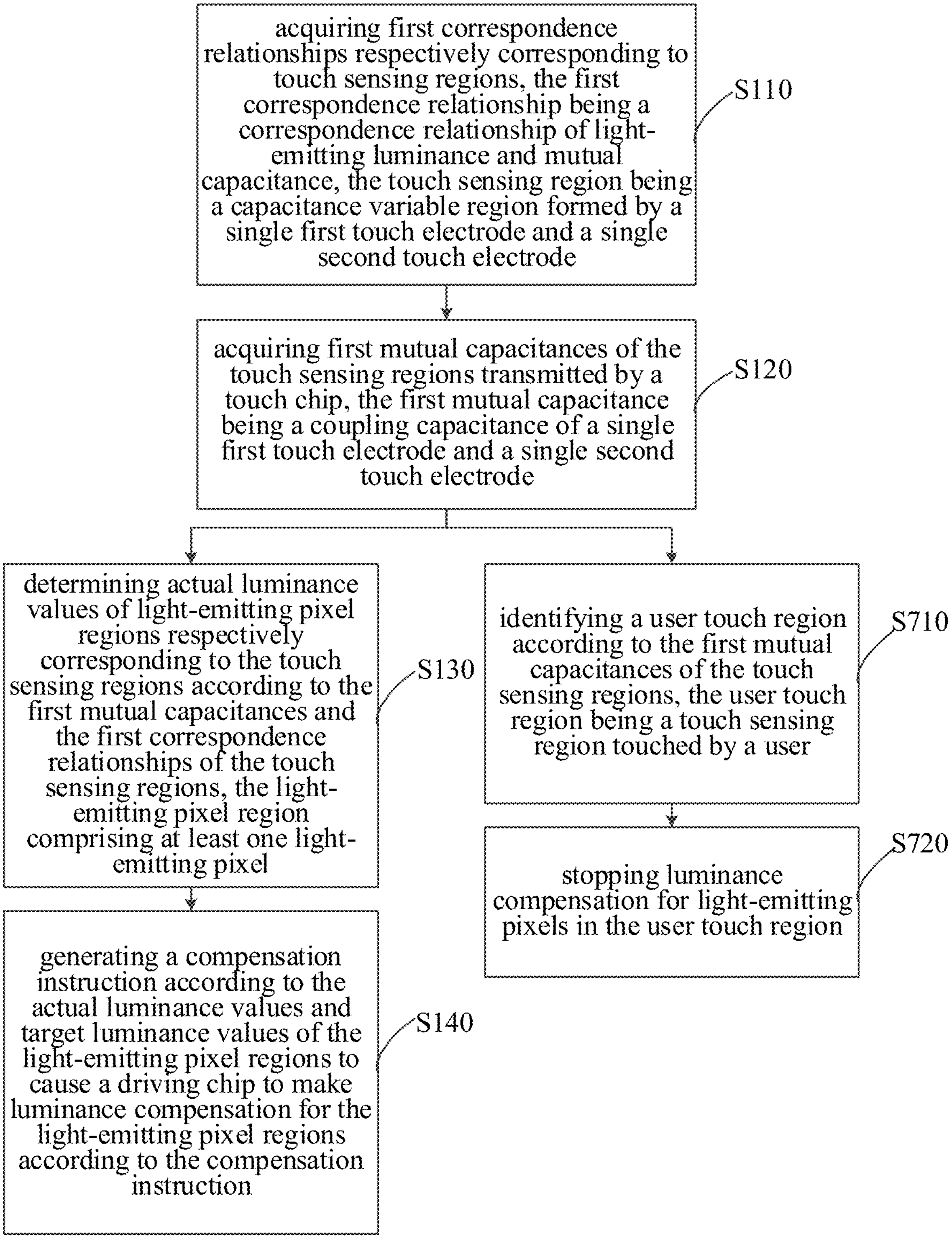
FIG. 13 is a schematic flowchart of a luminance compensation method of a display panel provided by another embodiment of the present application.

As an alternative embodiment, referring to FIG. 13, after the above S120, the method may also include S710 to S720.

S710: identifying a user touch region according to the first mutual capacitances of the touch sensing regions, the user touch region being a touch sensing region touched by a user;

S720: stopping luminance compensation for light-emitting pixels in the user touch region.

In this embodiment, by receiving the first mutual capacitances of the touch sensing regions, the user touch region can be identified according to the variation amplitude of the first mutual capacitances. The user cannot view the user touch region because it is blocked by the user's finger. Therefore, for the light-emitting pixels in the user touch region, luminance compensation can be stopped to reduce the resource consumption of luminance compensation.

In S710, after acquiring the first mutual capacitances of the touch sensing regions transmitted by the touch chip, the user touch region can be identified according to t the first mutual capacitances of the touch sensing regions. The user touch region is the touch sensing region touched by the user.

The touch chip can receive the first mutual capacitances of the touch sensing regions. When the user performs a touch operation, the first mutual capacitance corresponding to the touch sensing region touched by the user will change. Based on the amount of change of the first mutual capacitances of the touch sensing regions, the touch sensing region touched by the user can be identified from the touch sensing regions.

In S720, after identifying the user touch region from the touch sensing regions, the light-emitting pixel region corresponding to the user touch region can be determined, and the luminance compensation can be stopped for the light-emitting pixels within the light-emitting pixel region.

It is understandable that the luminance compensation of the light-emitting pixel region is performed to reduce the luminance difference of the light-emitting pixels. When the user touches a touch sensing region, the touch sensing region is blocked by the user's finger, and then the user cannot view the image picture displayed in the light-emitting pixel region corresponding to the touch sensing region. Therefore, in order to reduce the resource consumption of the luminance compensation, the luminance compensation can be stopped for the light-emitting pixels in the light-emitting pixel region that the user cannot view.

As an alternative embodiment, the above S710 may include S810 to S820.

S810: acquiring a capacitance threshold;

S820: under a condition that at least one first mutual capacitance of the first mutual capacitances is smaller than the capacitance threshold, determining a touch sensing region corresponding to the at least one first mutual capacitance as the user touch region.

In this embodiment, since the first mutual capacitance will be greatly reduced when the user touches, according to the pre-set capacitance threshold, when at least one first mutual capacitance is lower than the capacitance threshold, the touch sensing region corresponding to the first mutual capacitance below the capacitance threshold can be determined as the user touch region, so as to realize the identification of the user touch region.

In S810, when identifying the user touch region according to the first mutual capacitances of the touch sensing regions, the capacitance threshold can be obtained, and the user touch region may be determined according to the comparison results of the first mutual capacitances of the touch sensing regions and the capacitance threshold.

The change trend of the mutual capacitance of the touch sensing region is tested respectively under a condition that the display picture changes, the display luminance changes and the user performs touch operations. Further, the test results are as follows: when the display picture changes and the display luminance changes, the change of the mutual capacitance of the touch sensing region is small; when the user touches the touch sensing region, the change of the mutual capacitance of the touch sensing region is large.

When the user touches the touch sensing region, the mutual capacitance of the touch sensing region is greatly reduced, and the capacitance threshold for touch judgment can be determined based on the mutual capacitance of the touch sensing region when the user does not touch and the mutual capacitance of the touch sensing region when the user touches. The capacitance threshold is greater than the mutual capacitance of the touch sensing region when the user touches, and is smaller than the mutual capacitance of the touch sensing region when the user does not touch.

In S820, after acquiring the first mutual capacitances of the touch sensing regions, the first mutual capacitances can be compared with the capacitance threshold. Under a condition that at least one first mutual capacitance is smaller than the capacitance threshold, the touch sensing region corresponding to the first mutual capacitance smaller than the capacitance threshold may be determined as the user touch region.

It should be noted that when the display picture changes or the display luminance changes, the change of the mutual capacitance of the touch sensing region is small. Even if the display picture changes within the extreme luminance adjustment range, the minimum value within the change range of the mutual capacitance of the touch sensing region will not be smaller than the capacitance threshold. That is, when a certain first mutual capacitance is smaller than the capacitor threshold, it can be determined that the cause of the change of the first mutual capacitance is the user's touch operation.

Figure 14:
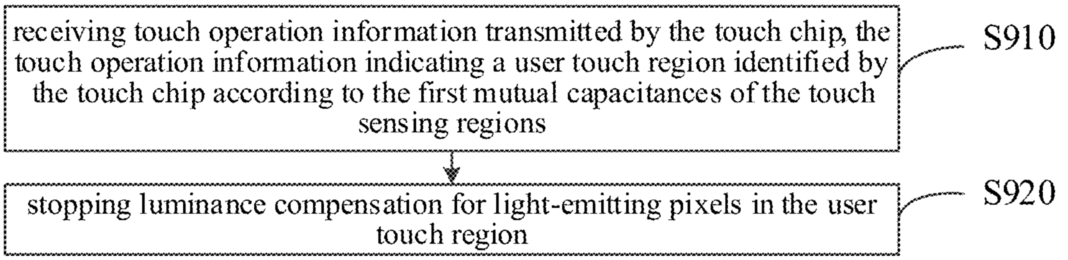
FIG. 14 is a schematic partial flowchart of a luminance compensation method of a display panel provided by an embodiment of the present application.

As an alternative embodiment, referring to FIG. 14, the above luminance compensation method of the display panel may also include S910 to S920.

S910: receiving touch operation information transmitted by the touch chip, the touch operation information indicating a user touch region identified by the touch chip according to the first mutual capacitances of the touch sensing regions;

S920: stopping luminance compensation for light-emitting pixels in the user touch region.

In this embodiment, the touch chip may identify the user touch region according to the first mutual capacitances, and may indicate the user touch region through the transmitted touch operation information. The display panel can stop the luminance compensation for the light-emitting pixels in the user touch region, thereby reducing the resource consumption of the luminance compensation.

In S910, after acquiring the first mutual capacitances of the touch sensing regions, the touch chip may judge the touch operation according to the first mutual capacitances. That is, the touch chip itself can identify the touch sensing region touched by the user according to the first mutual capacitances.

After the touch chip identifies the user's touch operation, the touch chip can transmit the touch operation information to the processing module of the display panel, which can determine the user touch region from the touch sensing regions according to the touch operation information.

In S920, after determining the user touch region according to the touch operation information transmitted by the touch chip, the driving chip can be controlled to stop the luminance compensation for light-emitting pixels in the user touch region.

In can be understood that the touch chip itself can identify the user's touch operation and outputs the corresponding data information to indicate the user's touch location or touch track. On this basis, the user touch region can be determined according to the data information, so that it is not necessary to repeat the identification operation of the first mutual capacitances on the basis of the touch chip identifying the touch operation, thereby reducing the consumption of processing resources.

Figure 15:
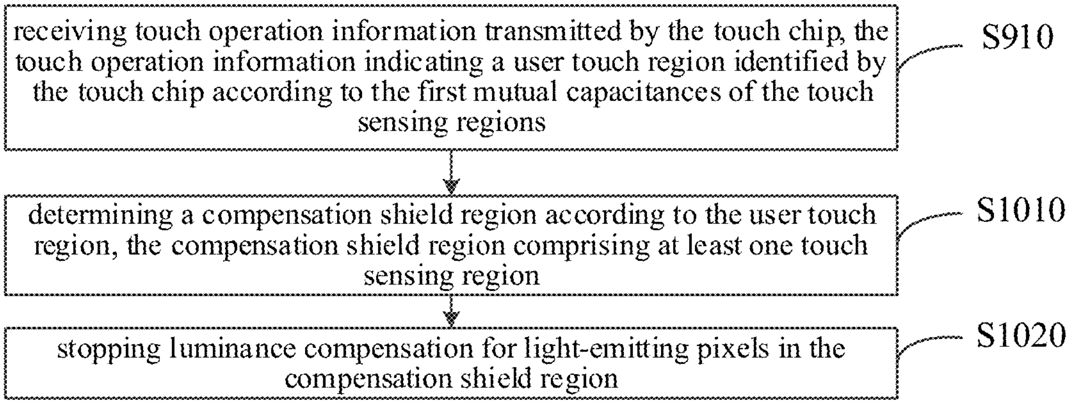
FIG. 15 is a schematic partial flowchart of a luminance compensation method of a display panel provided by another embodiment of the present application.

As an alternative embodiment, referring to FIG. 15, the above S920 may also include S1010 to S1020.

S1010: determining a compensation shield region according to the user touch region, the compensation shield region comprising at least one touch sensing region;

S1020: stopping luminance compensation for light-emitting pixels in the compensation shield region.

In this embodiment, when the user's finger touches the user touch region, the region covered by the finger may also include other touch sensing regions other than the user touch region. According to the size of a single touch sensing region, the compensation shield region around the user touch region may be determined. The compensation shield region refers to the extra touch sensing region covered by the user's finger when touching the user touch region. For the compensation shield region, the luminance compensation may also be stopped during the display process to reduce the resource consumption of the luminance compensation.

In S1010, after determining the user touch region corresponding to the user's touch operation, the compensation shield region may be further determined according to the user touch region. The compensation shield region includes at least one touch sensing region.

The display region of the display panel may be divided into multiple touch sensing regions, and the size of the touch sensing region is correlated to the number of the first touch electrodes and the second touch electrodes disposed in the display panel. That is, when there are more first and second touch electrodes, the display panel is divided into more touch sensing regions, and the display region corresponding to each touch sensing region is small. Conversely, when there are fewer first and second touch electrodes, the display panel is divided into less touch sensing regions, and the display region corresponding to each touch sensing region is large.

When the user performs a touch operation, the user's finger will cover a part of the display region of the display panel. When the display region corresponding to a single touch sensing region is small, except for the user touch region, the user's finger may also cover other touch sensing regions around the user touch region. Therefore, after determining the user touch region, the compensation shield region covered by the user's finger may be further determined.

In S1020, after determining the compensation shield region, the luminance compensation for the multiple touch sensing regions covered by the user's finger can be stopped to reduce the resource consumption of the luminance compensation.

As an alternative embodiment, after determining the touch sensing region touched by the user, that is, the user touch region, one or more touch sensing regions around the user touch region can be used as the compensation shield region. The relative positional relationship between the compensated shield region and the user touch region can be correlated to the display region corresponding to a single touch sensing region. When the display region corresponding to a single touch sensing region is large, the less touch sensing regions around the user touch region can be used as the compensation shield region; when the display region corresponding to a single touch sensing region is small, the more touch sensing regions around the user touch region can be used as the compensation shield region.

As an alternative embodiment, the execution subject in the above various embodiments may be a processing module of the display panel. That is, the processing module may be electrically connected to the touch chip and the driving chip of the display panel. The processing module may obtain the first mutual capacitances of the touch sensing regions from the touch chip, and may transmit the compensation instruction to the driving chip to control the driving chip to perform luminance compensation.

In another alternative embodiment, the execution subject in the above various embodiments may also be a terminal. The terminal may be disposed in the display panel, may be a set top box electrically connected to the display panel, or may be a mobile device, a PC, a server, or the like connected in communication with the display panel. The terminal may communicate with the touch chip and the driving chip to acquire the first mutual capacitances of the touch sensing regions. After calculating the luminance compensation values of the light-emitting pixel regions, the terminal may generate the compensation instruction and transmit it to the driving chip to control the driving chip to perform luminance compensation.

Figure 16:
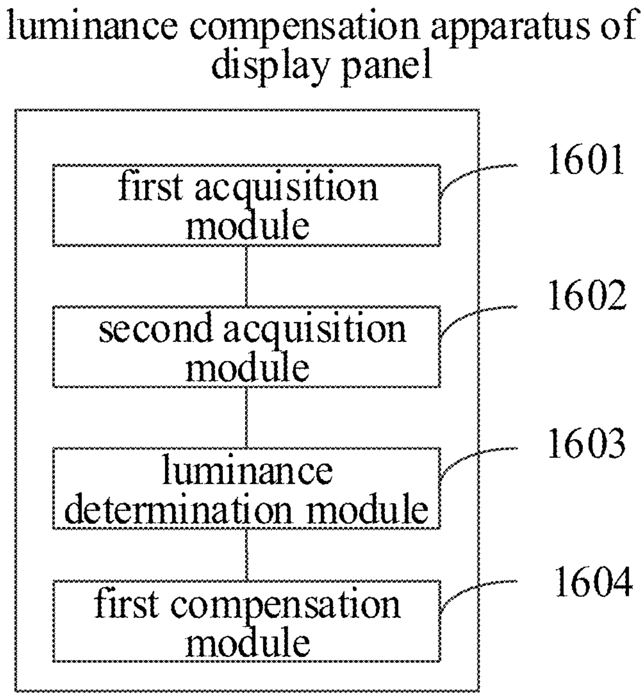
FIG. 16 is a schematic structural diagram of a luminance compensation apparatus of a display panel provided by an embodiment of the present application.

The embodiments of the present application further provide a luminance compensation apparatus of a display panel, as shown in FIG. 16, the apparatus comprising:

- a first acquisition module 1601 configured to acquire first correspondence relationships respectively corresponding to touch sensing regions, the first correspondence relationship being a correspondence relationship of light-emitting luminance and mutual capacitances;
- a second acquisition module 1602 configured to acquire first mutual capacitances of the touch sensing regions transmitted by a touch chip, the touch sensing region being a capacitance variable region formed by a single first touch electrode and a single second touch electrode, the first mutual capacitance being a coupling capacitance of a single first touch electrode and a single second touch electrode;
- a luminance determination module 1603 configured to determine actual luminance values of light-emitting pixel regions respectively corresponding to the touch sensing regions according to the first mutual capacitances and the first correspondence relationships of the touch sensing regions, the light-emitting pixel region comprising at least one light-emitting pixel;
- a first compensation module 1604 configured to generate a compensation instruction according to the actual luminance values and target luminance values of the light-emitting pixel regions to cause a driving chip to make luminance compensation for the light-emitting pixel regions according to the compensation instruction.

Figure 17:
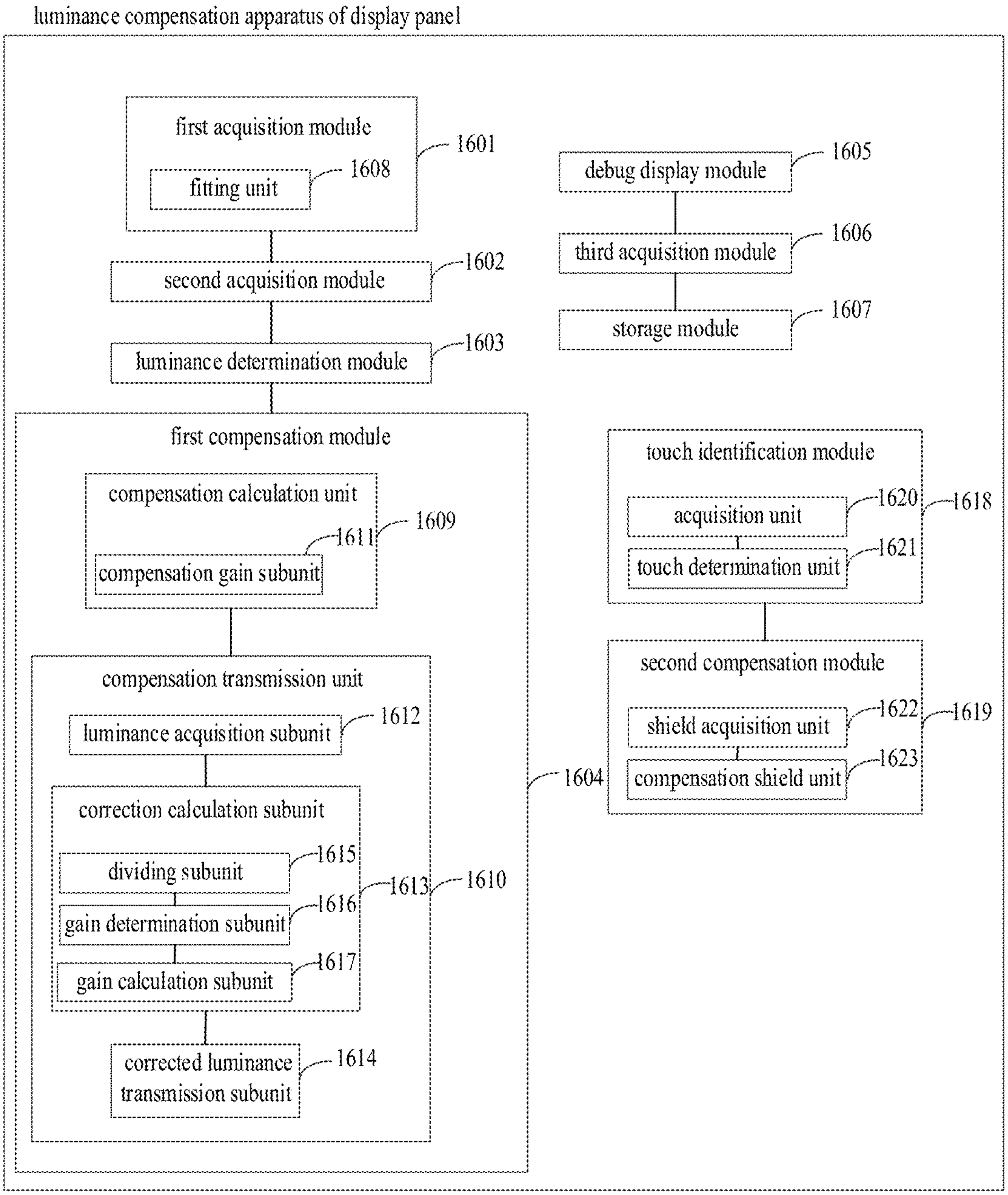
FIG. 17 is a schematic structural diagram of a luminance compensation apparatus of a display panel provided by another embodiment of the present application.

Please refer to FIG. 17, as an implementation of the present application, the above apparatus may also include:

- a debug display module 1605 configured to display white image pictures of different light-emitting luminance according to a received image display instruction;
- a third acquisition module 1606 configured to acquire second mutual capacitances respectively corresponding to the touch sensing regions under the white image pictures of different light-emitting luminance;
- a storage module 1607 configured to store the second mutual capacitances respectively corresponding to the touch sensing regions, or store the first correspondence relationships respectively corresponding to the touch sensing regions, the first correspondence relationship being generated according to the second mutual capacitance and the light-emitting luminance.

As an implementation of the present application, the third acquisition module 1606 is further configured to, under a condition that the display panel is powered on, read the second mutual capacitances respectively corresponding to the touch sensing regions under the white image pictures of different light-emitting luminance;

the above first acquisition module 1601 may include:

- a fitting unit 1608 configured to fit and generate the first correspondence relationships respectively corresponding to the touch sensing regions according to the second mutual capacitances of the touch sensing regions under different light-emitting luminance.

As an implementation of the present application, the above first compensation module 1604 may include:

- a compensation calculation unit 1609 configured to determine compensation parameters respectively corresponding to the light-emitting pixel regions according to the actual luminance values and the target luminance values of the light-emitting pixel regions;
- a compensation transmission unit 1610 configured to transmit the compensation parameters to the driving chip to cause the driving chip to make luminance compensation for the light-emitting pixel regions according to the compensation parameters.

As an implementation of the present application, the above compensation calculation unit 1609 may include:

- a compensation gain subunit 1611 configured to determine luminance compensation gains of the light-emitting pixel regions according to ratios of the target luminance values to the actual luminance values of the light-emitting pixel regions.

As an implementation of the present application, the above compensation transmission unit 1610 may include:

- a luminance acquisition subunit 1612 configured to acquire luminance values of light-emitting pixels in an image to be displayed;
- a correction calculation subunit 1613 configured to calculate corrected luminance values of the light-emitting pixels in the light-emitting pixel regions respectively according to the luminance compensation gains of the light-emitting pixel regions and the luminance values of the light-emitting pixels;
- a corrected luminance transmission subunit 1614 configured to transmit the corrected luminance values of the light-emitting pixels to the driving chip to cause the driving chip to make luminance compensation for the light-emitting pixels according to the corrected luminance values.

As an implementation of the present application, the above correction calculation subunit 1613 may include:

a dividing subunit 1615 configured to, for at least one light-emitting pixel region, divide the light-emitting pixels into first pixels and second pixels according to the luminance values of the light-emitting pixels, the luminance values of the first pixels being greater than an average luminance value of the light-emitting pixels, and the luminance values of the second pixels being less than the average luminance value of the light-emitting pixels;

a gain determination subunit 1616 configured to determine a first compensation gain and a second compensation gain according to the luminance compensation gain of the light-emitting pixel region, the first compensation gain being less than the luminance compensation gain, and the second compensation gain being greater than the luminance compensation gain;

a gain calculation subunit 1617 configured to calculate corrected luminance values of the first pixels respectively according to the first compensation gain and the luminance values of the first pixels; and calculate corrected luminance values of the second pixels respectively according to the second compensation gain and the luminance values of the second pixels.

As an implementation of the present application, the above apparatus may also include:

a touch identification module 1618 configured to identify a user touch region according to the first mutual capacitances of the touch sensing regions, the user touch region being a touch sensing region touched by a user;

a second compensation module 1619 configured to stop luminance compensation for light-emitting pixels in the user touch region.

As an implementation of the present application, the above touch identification module 1618 may include:

an acquisition unit 1620 configured to acquire a capacitance threshold;

a touch determination unit 1621 configured to, under a condition that at least one first mutual capacitance of the first mutual capacitances is smaller than the capacitance threshold, determine a touch sensing region corresponding to the at least one first mutual capacitance as the user touch region.

As an implementation of the present application, the above apparatus may also include:

a touch identification module 1618 configured to receive touch operation information transmitted by the touch chip, the touch operation information indicating a user touch region identified by the touch chip according to the first mutual capacitances of the touch sensing regions;

a second compensation module 1619 configured to stop luminance compensation for light-emitting pixels in the user touch region.

As an implementation of the present application, the above second compensation module 1619 may include:

a shield acquisition unit 1622 configured to determine a compensation shield region according to the user touch region, the compensation shield region comprising at least one touch sensing region;

a compensation shield unit 1622 configured to stop luminance compensation for light-emitting pixels in the compensation shield region.

Figure 18:
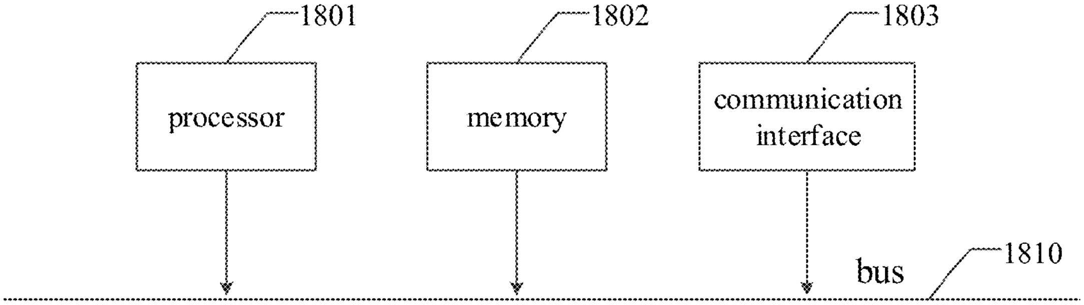
FIG. 18 is a schematic structural diagram of a luminance compensation device of a display panel provided by an embodiment of the present application.

FIG. 18 illustrates a schematic diagram of a hardware structure of a luminance compensation device of a display panel provided by an embodiment of the present application.

The luminance compensation device of the display panel may include a processor 1801 and a memory 1802 storing computer program instructions.

Specifically, the above processor 1801 may include a central processing unit (CPU), or an application specific integrated circuit (Application Specific Integrated Circuit, ASIC), or may be configured to implement one or more integrated circuits according to the embodiments of the present application.

The memory 1802 may include a mass storage for data or instructions. By way of examples rather than limitation, the memory 1802 may include a hard disk drive (Hard Disk Drive, HDD), a floppy disk drive, a flash memory, an optical disk, a magneto-optical disk, a magnetic tape or a universal serial bus (Universal Serial Bus, USB) drive, or a combination of two or more of them. Where appropriate, the memory 1802 may include a removable or non-removable (or fixed) medium. Where appropriate, the memory 1802 may be internal or external to the luminance compensation device of the display panel. In a particular embodiment, the memory 1802 may be a non-volatile solid state memory.

In particular embodiments, the memory 1802 may include a read-only memory (ROM), a random access memory (RAM), a magnetic disk storage media device, an optical storage media device, a flash memory device, an electrical, optical, or other physical/tangible memory storage device. Therefore, in general, the memory includes one or more tangible (non-transitory) computer-readable storage media (for example, a memory device) encoded with software including computer-executable instructions, and when executed (for example, by one or more processors), the software is operable to perform the operations described with reference to the method according to one aspect of the present disclosure.

The processor 1801 reads and executes the computer program instructions stored in the memory 1802 to implement any of the luminance compensation methods of the display panel in the foregoing embodiments.

In one example, the luminance compensation device of the display panel may further include a communication interface 1803 and a bus 1810. Here, as shown in FIG. 18, the processor 1801, the memory 1802, and the communication interface 1803 are connected through the bus 1810 and communicate with each other.

The communication interface 1803 may be mainly used to implement communications among various modules, apparatuses, units, and/or devices in the embodiments of the present application.

The bus 1810 may include a hardware, a software, or both, and may couple the components of the luminance compensation device of the display panel to each other. By way of examples rather than limitation, the bus may include an Accelerated Graphics Port (AGP) or other graphics buses, an Enhanced Industry Standard Architecture (EISA) bus, a Front Side Bus (FSB), a Hypertransport (HT) interconnect, an Industry Standard Architecture (ISA) Bus, an infinite bandwidth interconnect, a Low Pin Count (LPC) bus, a memory bus, a Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus, or other suitable buses, or a combination of two or more of them. Where appropriate, the bus 1810 may include one or more buses. Although specific buses are described and illustrated in the embodiments of the present application, the present application may contemplate any suitable bus or interconnect.

In addition, in combination with the luminance compensation methods of the display panel in the foregoing embodiments, the embodiments of the present application may be implemented by a computer storage medium. The computer storage medium may store computer program instructions thereon; the computer program instructions may implement, when executed by a processor, any of the luminance compensation methods of the display panel in the foregoing embodiments.

It should be clear that the present application is not limited to the specific configuration and processing described above and illustrated in figures. For the sake of simplicity, a detailed description of the known methods is omitted here. In the above embodiments, several specific steps are described and illustrated as examples. However, the method process of the present application is not limited to the specific steps described and shown, and after understanding the spirit of the present application, those skilled in the art can may make changes, modifications and additions, or may change the order of the steps.

The functional blocks shown in the structural views described above may be implemented as hardware, software, firmware, or a combination thereof. When implemented as hardware, it may be, for example, an electronic circuit, an application specific integrated circuit (ASIC), appropriate firmware, plugins, function cards, etc. When implemented as software, elements of the present application are programs or code segments for performing required tasks. The programs or code segments may be stored in a machine-readable medium, or transmitted on a transmission medium or a communication link through a data signal carried in a carrier wave. The "machine-readable medium" may include any medium that can store or transmit information. Examples of the machine-readable medium include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segments may be downloaded via a computer network such as the Internet, intranet, and so on.

It should also be noted that according to the exemplary embodiments described in the present application, some methods or systems are described based on a series of steps or apparatuses. However, the present application is not limited to the above order of the steps. That is, the steps may be executed in the order described in the embodiments or in orders different from that in the embodiments, or several steps may be executed simultaneously.

Aspects of the present application are described above with reference to flowcharts and/or block diagrams of methods, devices (systems) and machine program products according to embodiments of the present application. It will be understood that each block of the flowcharts and/or block diagrams, and combinations of blocks of the flowcharts and/or block diagrams, can be implemented by computer program instructions. These computer program instructions may be provided to a processor of a general purpose computer, a special purpose computer, or other programmable data processing device to produce a machine, such that these instructions executed by the processor of the computer or other programmable data processing device can enable implementation of the functions/acts specified in one or more blocks of the flowcharts and/or block diagrams. Such a processor may be, but not limited to, a general purpose processor, a special purpose processor, an application specific processor, or a field programmable logic circuit. It will also be understood that each block of the block diagrams and/or flowcharts, and combinations of blocks of the block diagrams and/or flowcharts, can also be implemented by special purpose hardware for performing specified functions or actions, or can be implemented by a combination of special purpose hardware and computer instructions.

The above are only specific implementations of the present application, those skilled in the art can clearly understand that, for the convenience and brevity of the description, the specific working processes of the above-described systems, modules and units can be referred to the corresponding processes in the foregoing method embodiments, which is not repeated here. It should be understood that, the protection scope of the present application is not limited to this, and any person skilled in the art can easily think of various equivalent modifications or replacements within the technical scope disclosed in the present application, and these modifications or replacements should all be covered within the scope of protection of the present application.

What is claimed is:

1. A luminance compensation method of a display panel, wherein the display panel comprises at least one first touch electrode and at least one second touch electrode staggered with each other, the method comprises:

acquiring first correspondence relationships respectively corresponding to touch sensing regions, each of the first correspondence relationships being a correspondence relationship of light-emitting luminance and mutual capacitance, each of the touch sensing regions being a capacitance variable region formed by a single first touch electrode and a single second touch electrode;

acquiring first mutual capacitances of the touch sensing regions transmitted by a touch chip, each of the first mutual capacitances being a coupling capacitance of a single first touch electrode and a single second touch electrode;

determining actual luminance values of light-emitting pixel regions respectively corresponding to the touch sensing regions according to the first mutual capacitances and the first correspondence relationships of the touch sensing regions, each of the light-emitting pixel regions comprising at least one light-emitting pixel; and generating a compensation instruction according to the actual luminance values and target luminance values of the light-emitting pixel regions to cause a driving chip to make luminance compensation for the light-emitting pixel regions according to the compensation instruction;

wherein before acquiring the first correspondence relationships respectively corresponding to the touch sensing regions, the method further comprises:

displaying white image pictures of different light-emitting luminance values according to a received image display instruction;

acquiring second mutual capacitances corresponding to each of the touch sensing regions under the white image pictures of the different light-emitting luminance values;

storing the second mutual capacitances corresponding to each of the touch sensing regions, or storing the first correspondence relationships respectively corresponding to the touch sensing regions, each of the first correspondence relationships being generated respectively according to the second mutual capacitances and the different light-emitting luminance values.

2. The luminance compensation method of the display panel according to claim 1, wherein acquiring the first correspondence relationships respectively corresponding to the touch sensing regions comprises:

under a condition that the display panel is powered on, reading the second mutual capacitances respectively corresponding to the touch sensing regions under the white image pictures of different light-emitting luminance values;

fitting and generating the first correspondence relationships respectively corresponding to the touch sensing regions according to the second mutual capacitances corresponding to each of the touch sensing regions under the different light-emitting luminance values.

3. The luminance compensation method of the display panel according to claim 1, wherein according to the second mutual capacitances respectively corresponding to the touch sensing regions under different light-emitting luminance values, slopes and intercepts of linear fit functions respectively corresponding to the touch sensing regions are obtained by linearly fitting the different light-emitting luminance values and the second mutual capacitances corresponding to each of the touch sensing regions.

4. The luminance compensation method of the display panel according to claim 1, wherein generating the compensation instruction according to the actual luminance values and the target luminance values of the light-emitting pixel regions to cause the driving chip to make luminance compensation for the light-emitting pixel regions according to the compensation instruction comprises:

determining compensation parameters respectively corresponding to the light-emitting pixel regions according to the actual luminance values and the target luminance values of the light-emitting pixel regions;

transmitting the compensation parameters to the driving chip to cause the driving chip to make luminance compensation for the light-emitting pixel regions according to the compensation parameters.

5. The luminance compensation method of the display panel according to claim 4, wherein determining the compensation parameters respectively corresponding to the light-emitting pixel regions according to the actual luminance values and the target luminance values of the light-emitting pixel regions comprises:

determining luminance compensation gains of the light-emitting pixel regions according to ratios of the target luminance values to the actual luminance values of the light-emitting pixel regions.

6. The luminance compensation method of the display panel according to claim 5, wherein transmitting the compensation parameters to the driving chip to cause the driving chip to make luminance compensation for the light-emitting pixel regions according to the compensation parameters comprises:

acquiring luminance values of light-emitting pixels in an image to be displayed;

calculating corrected luminance values of the light-emitting pixels in the light-emitting pixel regions respectively according to the luminance compensation gains of the light-emitting pixel regions and the luminance values of the light-emitting pixels;

transmitting the corrected luminance values of the light-emitting pixels to the driving chip to cause the driving chip to make luminance compensation for the light-emitting pixels according to the corrected luminance values.

7. The luminance compensation method of the display panel according to claim 6, wherein calculating the corrected luminance values of the light-emitting pixels in the light-emitting pixel regions respectively according to the luminance compensation gains of the light-emitting pixel regions and the luminance values of the light-emitting pixels comprises:

for at least one light-emitting pixel region, dividing the light-emitting pixels into first pixels and second pixels according to the luminance values of the light-emitting pixels, luminance values of the first pixels being greater than an average luminance value of the light-emitting pixels, and luminance values of the second pixels being less than the average luminance value of the light-emitting pixels;

determining a first compensation gain and a second compensation gain according to a luminance compensation gain of the at least one light-emitting pixel region, the first compensation gain being less than the luminance compensation gain, and the second compensation gain being greater than the luminance compensation gain;

calculating corrected luminance values of the first pixels respectively according to the first compensation gain and the luminance values of the first pixels; calculating corrected luminance values of the second pixels respectively according to the second compensation gain and the luminance values of the second pixels.

8. The luminance compensation method of the display panel according to claim 1, wherein after acquiring the first mutual capacitances of the touch sensing regions transmitted by the touch chip, the method further comprises:

identifying a user touch region according to the first mutual capacitances of the touch sensing regions, the user touch region being a touch sensing region touched by a user;

stopping luminance compensation for light-emitting pixels in the user touch region.

9. The luminance compensation method of the display panel according to claim 8, wherein identifying the user touch region according to the first mutual capacitances of the touch sensing regions comprises:

acquiring a capacitance threshold;

under a condition that at least one first mutual capacitance of the first mutual capacitances is smaller than the capacitance threshold, determining a touch sensing region corresponding to the at least one first mutual capacitance as the user touch region.

10. The luminance compensation method of the display panel according to claim 1, wherein the luminance compensation method of the display panel further comprises:

receiving touch operation information transmitted by the touch chip, the touch operation information indicating a user touch region identified by the touch chip according to the first mutual capacitances of the touch sensing regions;

stopping luminance compensation for light-emitting pixels in the user touch region.

11. The luminance compensation method of the display panel according to claim 10, wherein stopping the luminance compensation for the light-emitting pixels in the user touch region comprises:

determining a compensation shield region according to the user touch region, the compensation shield region comprising at least one touch sensing region;

stopping luminance compensation for light-emitting pixels in the compensation shield region.

12. A luminance compensation apparatus of a display panel, wherein the apparatus comprises:

a first acquisition module configured to acquire first correspondence relationships respectively corresponding to touch sensing regions, each of the first correspondence relationships being a correspondence relationship of light-emitting luminance and mutual capacitance;

a second acquisition module configured to acquire first mutual capacitances of the touch sensing regions transmitted by a touch chip, each of the touch sensing regions being a capacitance variable region formed by a single first touch electrode and a single second touch electrode, each of the first mutual capacitances being a coupling capacitance of a single first touch electrode and a single second touch electrode;

a luminance determination module configured to determine actual luminance values of light-emitting pixel regions respectively corresponding to the touch sensing regions according to the first mutual capacitances and the first correspondence relationships of the touch sensing regions, each of the light-emitting pixel regions comprising at least one light-emitting pixel;

a first compensation module configured to generate a compensation instruction according to the actual luminance values and target luminance values of the light-emitting pixel regions to cause a driving chip to make luminance compensation for the light-emitting pixel regions according to the compensation instruction;

a debug display module configured to display white image pictures of different light-emitting luminance values according to a received image display instruction;

a third acquisition module configured to acquire second mutual capacitances respectively corresponding to each of the touch sensing regions under the white image pictures of different light-emitting luminance values; and a storage module configured to store the second mutual capacitances corresponding to each of the touch sensing regions, or store the first correspondence relationships respectively corresponding to the touch sensing regions, each of the first correspondence relationships being generated respectively according to the second mutual capacitances and the different light-emitting luminance values.

13. The luminance compensation apparatus of the display panel according to claim 12, wherein the apparatus further comprises:

a touch identification module configured to identify a user touch region according to the first mutual capacitances of the touch sensing regions, the user touch region being a touch sensing region touched by a user;

a second compensation module configured to stop luminance compensation for light-emitting pixels in the user touch region.

14. The luminance compensation apparatus of the display panel according to claim 12, wherein the apparatus further comprises:

a touch identification module configured to receive touch operation information transmitted by the touch chip, the touch operation information indicating a user touch region identified by the touch chip according to the first mutual capacitances of the touch sensing regions;

a second compensation module configured to stop luminance compensation for light-emitting pixels in the user touch region.

15. A luminance compensation device of a display panel, wherein the luminance compensation device of the display panel comprises: a processor and a memory storing computer program instructions;

wherein the processor, when executing the computer program instructions, implements a luminance compensation method of the display panel, wherein the display panel comprises at least one first touch electrode and at least one second touch electrode staggered with each other, the method comprises:

acquiring first correspondence relationships respectively corresponding to touch sensing regions, each of the first correspondence relationships being a correspondence relationship of light-emitting luminance and mutual capacitance, each of the touch sensing regions being a capacitance variable region formed by a single first touch electrode and a single second touch electrode;

acquiring first mutual capacitances of the touch sensing regions transmitted by a touch chip, each of the first mutual capacitances being a coupling capacitance of a single first touch electrode and a single second touch electrode;

determining actual luminance values of light-emitting pixel regions respectively corresponding to the touch sensing regions according to the first mutual capacitances and the first correspondence relationships of the touch sensing regions, each of the light-emitting pixel regions comprising at least one light-emitting pixel;

generating a compensation instruction according to the actual luminance values and target luminance values of the light-emitting pixel regions to cause a driving chip to make luminance compensation for the light-emitting pixel regions according to the compensation instruction;

wherein before acquiring the first correspondence relationships respectively corresponding to the touch sensing regions, the method further comprises:

displaying white image pictures of different light-emitting luminance values according to a received image display instruction;

acquiring second mutual capacitances corresponding to each of the touch sensing regions under the white image pictures of the different light-emitting luminance values;

storing the second mutual capacitances corresponding to each of the touch sensing regions, or storing the first correspondence relationships respectively corresponding to the touch sensing regions, each of the first correspondence relationships being generated respectively according to the second mutual capacitances and the different light-emitting luminance values.

* * * * *